(12) United States Patent
Kimura

(10) Patent No.: US 11,943,055 B2
(45) Date of Patent: Mar. 26, 2024

(54) COMMUNICATION DEVICE AND COMMUNICATION METHOD

(71) Applicant: SONY GROUP CORPORATION, Tokyo (JP)

(72) Inventor: Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 17/427,994

(22) PCT Filed: Jan. 6, 2020

(86) PCT No.: PCT/JP2020/000055
§ 371 (c)(1),
(2) Date: Aug. 3, 2021

(87) PCT Pub. No.: WO2020/166230
PCT Pub. Date: Aug. 20, 2020

(65) Prior Publication Data
US 2022/0123871 A1 Apr. 21, 2022

(30) Foreign Application Priority Data
Feb. 13, 2019 (JP) .................................. 2019-023994

(51) Int. Cl.
*H04L 1/1812* (2023.01)
*H04W 28/04* (2009.01)

(52) U.S. Cl.
CPC ........... *H04L 1/1812* (2013.01); *H04W 28/04* (2013.01)

(58) Field of Classification Search
None
See application file for complete search history.

(56) References Cited

U.S. PATENT DOCUMENTS

2008/0184087 A1 7/2008 Hayashi
2011/0296275 A1 12/2011 Kishigami et al.
(Continued)

FOREIGN PATENT DOCUMENTS

CN 101232443 A 7/2008
CN 107005252 A 8/2017
(Continued)

OTHER PUBLICATIONS

International Search Report and Written Opinion of PCT Application No. PCT/JP2020/000055, dated Feb. 4, 2020, 13 pages of ISRWO.
(Continued)

*Primary Examiner* — Guerrier Merant
(74) *Attorney, Agent, or Firm* — CHIP LAW GROUP

(57) ABSTRACT

Provided is a communication device that implements error correction in a physical layer in combination with HARQ. The communication device on the transmitting side adds a CRC sequence to an information sequence, divides an information sequence having a CRC sequence added thereto into a plurality of sequences, implements first FEC coding by using a sequence obtained by division, adds a CRC sequence to a coded sequence obtained after first FEC coding, implements second FEC coding by using a coded sequence having a CRC sequence added thereto, couples coded sequences obtained after second coding, transmits a coded information sequence obtained after coupling to another communication device, and controls retransmission with a coded sequence obtained after first coding as a unit.

10 Claims, 22 Drawing Sheets

(56) References Cited

U.S. PATENT DOCUMENTS

| | | |
|---|---|---|
| 2016/0173232 A1 | 6/2016 | Mallik et al. |
| 2018/0048421 A1 | 2/2018 | Yeo et al. |
| 2018/0092104 A1 | 3/2018 | Sheng et al. |

FOREIGN PATENT DOCUMENTS

| | | |
|---|---|---|
| CN | 107733565 A | 2/2018 |
| CN | 110199484 A | 9/2019 |
| EP | 2385644 A1 | 11/2011 |
| EP | 3282615 A1 | 2/2018 |
| JP | 08-149018 A | 6/1996 |
| JP | 2007-243440 A | 9/2007 |
| JP | 2008-182648 A | 8/2008 |
| JP | 2017-539165 A | 12/2017 |
| KR | 10-2017-0095221 A1 | 8/2017 |
| KR | 10-2018-0018188 A | 2/2018 |
| WO | 2010/087197 A1 | 8/2010 |
| WO | 2016/100363 A1 | 6/2016 |
| WO | 2018/064062 A1 | 4/2018 |

OTHER PUBLICATIONS

"Outer Code Design for URLLC and eMBB Multiplexing", Qualcomm Incorporated, 3GPP TSG-RAN WG1, 88th meeting, Athens, Greece, R1-1702641, Feb. 13-17, 2017, 10 pages.

"3rd Generation Partnership Project; Technical Specification Group Radio Access Network; NR; Multiplexing and channel coding (Release 15)", 3GPP TS 38.212, V15.4.0, 3GPP Standard; Technical Specification, Dec. 2018, 100 pages.

COMMUNICATION DEVICE AND COMMUNICATION METHOD

CROSS REFERENCE TO RELATED APPLICATIONS

This application is a U.S. National Phase of International Patent Application No. PCT/JP2020/000055 filed on Jan. 6, 2020, which claims priority benefit of Japanese Patent Application No. JP 2019-023994 filed in the Japan Patent Office on Feb. 13, 2019. Each of the above-referenced applications is hereby incorporated herein by reference in its entirety.

TECHNICAL FIELD

The technology disclosed herein relates to a communication device and a communication method for transmitting and receiving radio signals.

BACKGROUND ART

Error correction technology is important for ensuring the reliability of digital communication, and error correction is implemented in a physical layer, for example. Furthermore, an error correction device that performs erasure correction using Reed-Solomon codes has been proposed (see Patent Document 1).

Furthermore, it is common in the field of wireless communication to apply error correction technology including hybrid automatic repeat request (hybrid ARQ (HARQ)) in a physical layer (Layer 1). For example, a convolutional code, a low density parity-check (LDPC) code, or the like is used in a wireless local area network (LAN) system. In a cellular system, any error correction technology such as a convolutional code, a turbo code, an LDPC code, a Polar code, or the like is also used, and moreover, HARQ is also used. As a result, efforts are being made to ensure the quality required for a radio section while responding to the state of the radio wave transmission line and interference, and fluctuation thereof.

Patent Document 1 discloses an erasure correction technology, but does not mention a communication system that employs HARQ. As soon as HARQ is combined with erasure correction technology, there arises a concern that the effect of introducing the erasure correction technology will not be obtained. Therefore, the applicant considers that it is necessary to realize reproduction and synthesis including erasure correction while considering the influence on the efficiency, delay, and reliability of a target communication system.

CITATION LIST

Patent Document

Patent Document 1: Japanese Patent Application Laid-Open No. H08-149018

SUMMARY OF THE INVENTION

Problems to be Solved by the Invention

An object of the technology disclosed herein is to provide a communication device and a communication method for implementing error correction in a physical layer.

Solutions to Problems

The technology disclosed herein has been made in consideration of the problems described above, and the first aspect thereof is a communication device including:
a first CRC addition unit that adds a CRC sequence to an information sequence to be transmitted;
a division unit that divides an information sequence having a CRC sequence added thereto into a plurality of sequences;
a first FEC coding unit that implements first FEC coding by using a sequence obtained by division;
a second CRC addition unit that adds a CRC sequence to a coded sequence after first FEC coding;
a second FEC coding unit that implements second FEC coding by using a coded sequence having a CRC sequence added thereto;
a coupling unit that couples coded sequences obtained after second coding;
a transmitting unit that transmits a coded information sequence obtained after coupling to another communication device; and
a retransmission control unit that controls retransmission with a coded sequence obtained after first coding as a unit.

The first FEC is any one of an erasure code, a rateless code, a Raptor code, or a Raptor Q code. Furthermore, the second FEC is either an LDPC code or a Polar code.

Furthermore, the determination unit determines whether to implement first FEC coding or not on the basis of at least one of the status of the receiving side communication device, an application of a target information sequence, or the status of a target information sequence.

The second FEC coding unit implements second FEC coding by using some of a plurality of coded sequences obtained after first FEC coding. For example, the second FEC coding unit does not implement second FEC coding of a coded sequence, transmission/reception of which has succeeded in previous transmission, and implements second FEC coding of at least some of coded sequences that have not been transmitted in the last time transmission.

The retransmission control unit retransmits at least some of coded sequences that have not been transmitted in the last time transmission, and implements retransmission by a combination of different coded sequences for each transmission time. Specifically, the retransmission control unit retransmits at least some of coded sequences, transmission/reception of which has failed in the last time transmission.

Furthermore, the second aspect of the technology disclosed herein is a communication method including:
a first CRC addition step of adding a CRC sequence to an information sequence to be transmitted;
a division step of dividing an information sequence having a CRC sequence added thereto into a plurality of sequences;
a first FEC coding step of implementing first FEC coding by using a sequence obtained by division;
a second CRC addition step of adding a CRC sequence to a coded sequence obtained after first FEC coding;
a second FEC coding step of implementing second FEC coding by using a coded sequence having a CRC sequence added thereto;
a coupling step of coupling coded sequences obtained after second coding;

a transmission step of transmitting a coded information sequence obtained after coupling to another communication device; and a retransmission step of controlling retransmission with a coded sequence obtained after first coding as a unit.

Furthermore, the third aspect of the technology disclosed herein is a communication device including:

a division unit that divides a received information sequence generated from a received signal into a plurality of sequences;

a second decoding unit that implements second FEC decoding by using a sequence obtained by division;

a first determination unit that determines whether a sequence obtained after second FEC decoding includes an error or not;

a first decoding unit that implements first FEC decoding by using a sequence obtained after second FEC decoding;

a second determination unit that determines whether a sequence obtained after first decoding includes an error or not; and a control unit that controls transmission of ACK or NACK to a communication device on a transmitting side on the basis of determination result by the second determination unit.

The control unit controls transmission of NACK including information for identifying which of sequences obtained after second FEC decoding includes an error, in a case where a sequence obtained after first decoding includes an error.

Furthermore, a communication device according to the third aspect further has a function of performing HARQ synthesis, and the second FEC decoding unit is configured to implement second FEC decoding only for a sequence in which an error has occurred in the second FEC decoding last time.

Furthermore, the fourth aspect of the technology disclosed herein is a communication method including:

a division step of dividing a received information sequence generated from a received signal into a plurality of sequences;

a second decoding step of implementing second FEC decoding by using a sequence obtained by division;

a first determination step of determining whether a sequence obtained after second FEC decoding includes an error or not;

a first decoding step of implementing first FEC decoding by using a sequence obtained after second FEC decoding;

a second determination step of determining whether a sequence obtained after first decoding includes an error or not; and a control step of controlling transmission of ACK or NACK to a communication device on a transmitting side on the basis of determination result in the second determination step.

Effects of the Invention

It is possible with the technology disclosed herein to provide a communication device and a communication method for implementing error correction in a physical layer in combination with HARQ.

Note that the effects described herein are merely exemplification, and effects of the present invention are not limited thereto. Furthermore, the present invention may further produce additional effects in addition to the effects described above.

Other objects, characteristics, or advantages of the technology disclosed herein will further become apparent from the more detailed description based on the embodiments described later or the accompanying drawings.

MODE FOR CARRYING OUT THE INVENTION

The following description will explain embodiments of the technology disclosed herein in detail with reference to the drawings.

Example 1

A. System Configuration

Figure 1:
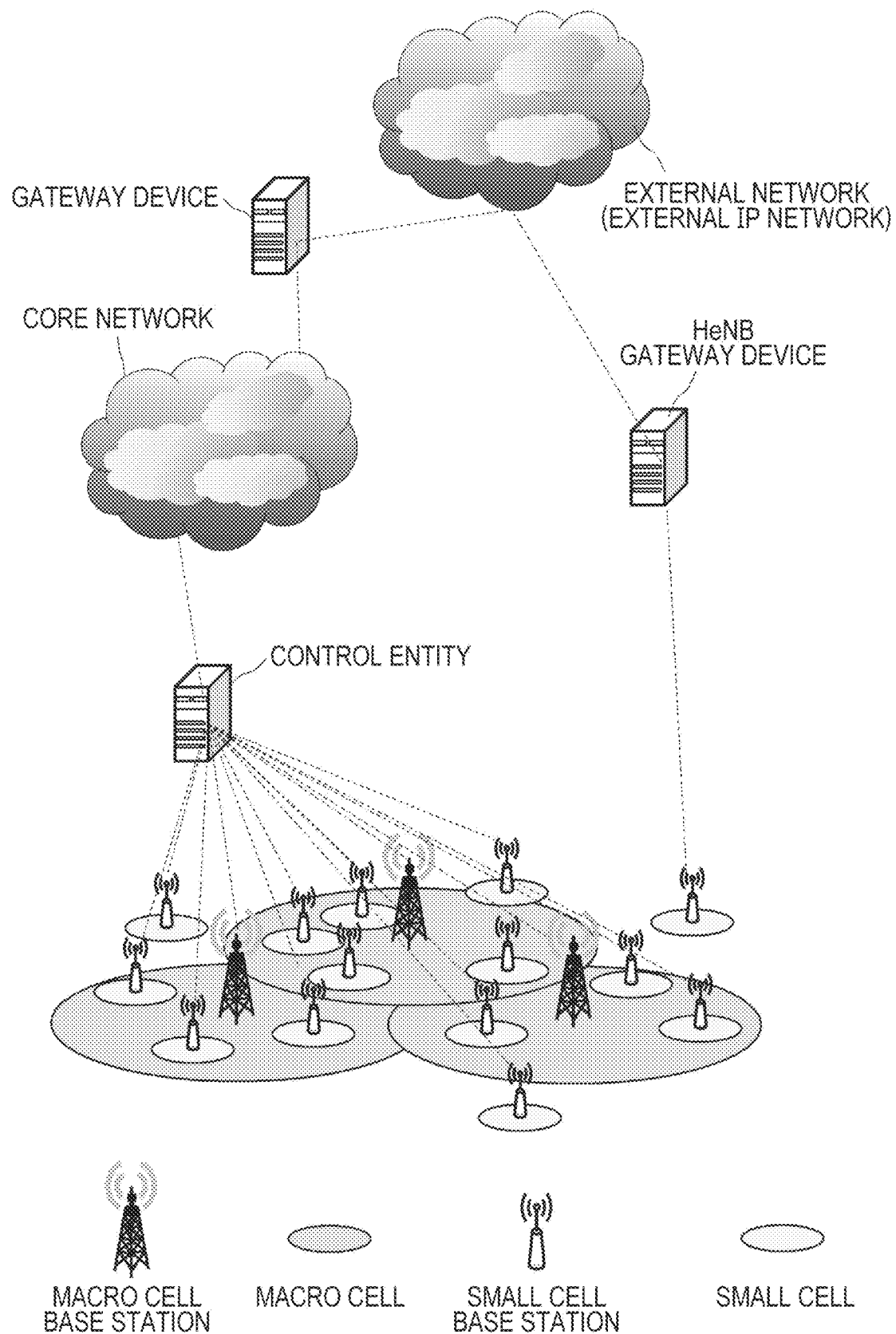
FIG. 1 is a diagram showing a configuration example of a communication system.

FIG. 1 shows a configuration example of a communication system to which the technology disclosed herein can be applied. In the figure, lines between communication devices are shown with broken lines. A communication device includes base stations (microcell base stations, small cell base stations), a control entity, a gateway device, and the like. It should be noted that a line mentioned here means a logical connection and is not necessarily directly connected physically.

The communication area provided by the communication system is configured with "cells" where a plurality of base stations respectively provides services. In FIG. 1, a cell is drawn as an ellipse. One base station may provide a plurality of cells. Examples of a base station include a macro cell base station that provides service in a macro cell area, and a small cell base station that provides service in a small cell area.

A small cell area is basically arranged to overlap a macro cell area. However, a small cell area may exist partially or completely outside a macro cell area. A group (cluster) may be configured with a plurality of small cell base stations. Furthermore, a base station having a role of a cluster head may be provided in a cluster.

A macro cell and a small cell may be characterized by a radio resource to be used. For example, a macro cell and a small cell may use the same frequency resource F1 or the same time resource T1. In this way, it is possible to improve the usage efficiency of a radio resource as an entire communication system. On the other hand, a macro cell may use a frequency resource F1 or a time resource T1, while a small cell may use a frequency resource F2 or a time resource T2. In this way, it is possible to avoid interference between a macro cell and a small cell. Moreover, the frequency resources F1 and F2 or the time resources T1 and T2 may be used by both a macro cell and a small cell. The idea is especially equivalent to carrier aggregation (CA) when applied to a frequency resource.

Base stations can communicate with each other via a backhaul, and mainly implement exchange of control information. The topology of the backhaul between base stations may be mesh type, star type, ring type, or another type. Furthermore, the backhaul may connect the base station and the core network via an external network. The backhaul may be wired or wireless. The backhaul may employ, for example, exchange of information using a protocol of an X2 interface or an S1 interface.

Furthermore, the base station also has a backhaul to be connected with a core network of the communication system. As illustrated, the communication system may be connected with the core network via connection with the control entity. The control entity may also be regarded as one of the elements of the core network. Furthermore, a base station may be connected with the core network not via the control entity but via an external network. For example, a communication system is connected with an external network via a femtocell base station device or a Home eNodeB (HeNB) device that can be installed indoors or at home.

B. Procedure of FEC and HARQ

In the communication system according to the present example, it is assumed that forward error correction (FEC) and HARQ are combined in a physical layer (Layer 1), for example, in the process of in-cell communication.

Figure 2:
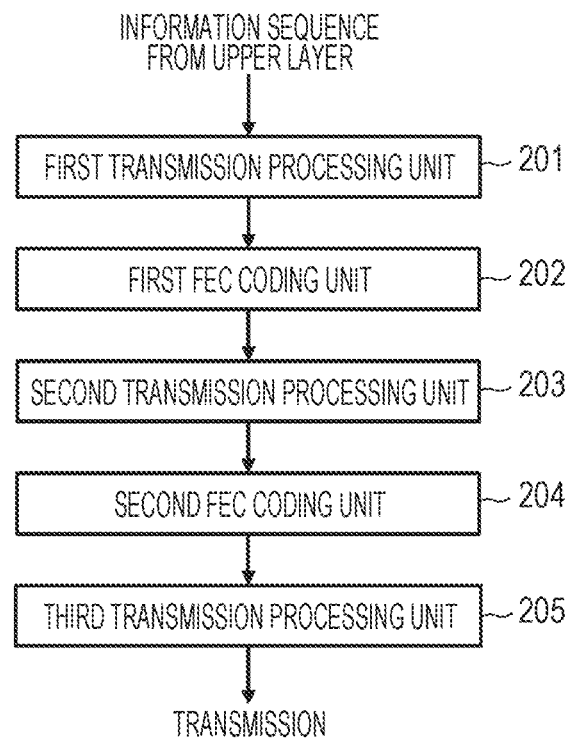
FIG. 2 is a diagram showing a functional configuration example of a signal processing unit on the transmitting side.
Figure 3:
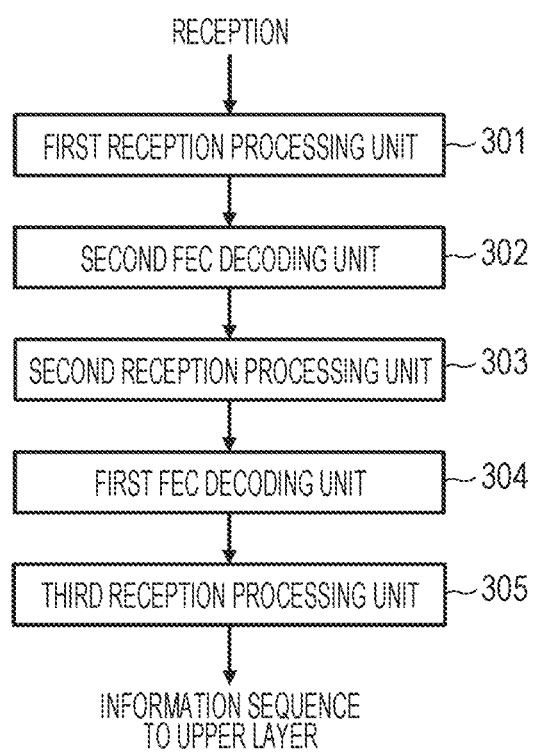
FIG. 3 is a diagram showing a functional configuration example of a signal processing unit on the receiving side.

FIG. 2 shows a functional configuration example of a signal processing unit on the transmitting side in a communication system according to the present embodiment. Furthermore, FIG. 3 shows a functional configuration example of a signal processing unit on the receiving side in a communication system according to the present embodiment. In the present embodiment, a plurality of forward error correction (FEC) codes is applied to the information sequence to be transmitted/received.

On the transmitting side, a first FEC coding processing unit 202 is inserted between a first transmission processing unit 201 and a second transmission processing unit 203, and a second FEC coding processing unit 204 is inserted between the second transmission processing unit 203 and a third transmission processing unit 205 as shown in FIG. 2. Furthermore, on the receiving side, a second FEC decoding processing unit 302 is inserted between a first receiving unit 301 and a second receiving unit 303, and a first FEC decoding processing unit 304 is inserted between a second reception processing unit 303 and a third reception processing unit 305 as shown in FIG. 3.

The first FEC decoding processing in the first FEC decoding processing unit 304 is decoding processing corresponding to the first FEC coding processing in the first FEC coding unit 202 on the transmitting side. Furthermore, the second FEC decoding processing in the second FEC decoding processing unit 302 is decoding processing corresponding to the second FEC coding processing in the second FEC coding unit 204 on the transmitting side. The types of the first FEC are shown in Table 1 below, and the types of the second FEC are shown in Table 2 below.

TABLE 1

| Example of first FEC code |
|---|
| Erasure code |
| Rateless code |
| Fountain code |
| Tornade code |
| LT code |
| Raptor code |
| Raptor Q code |
| LDPC code |
| BCH code |
| RS code |
| XOR code |

TABLE 2

| Example of second FEC code |
|---|
| Convolutional code |
| Turbo code |
| LDPC code |
| Polar code |

It is desirable that the first FEC is an FEC method included in categories such as erasure codes, rateless codes, and fountain codes, or an FEC method of coding a plurality of bit sequences by linear synthesis or XOR synthesis. Furthermore, it is desirable that the second FEC is an FEC method included in categories such as convolutional codes, turbo codes, low density parity check (LDPC) codes, and polar codes.

As described later, processing of the first FEC coding and decoding proceeds with predetermined bit blocks (which will also be hereinafter referred to as "blocks" in the present specification) as a unit in the present embodiment. Table 3 below shows the input/output correspondence between blocks on the transmitting side and the receiving side.

TABLE 3

| Transmitting side | Receiving side | Example to be cited especially |
|---|---|---|
| Information sequence from upper layer | Information sequence to upper layer | Transport Block, PSDU (Physical Layer Service Data Unit), PPDU (Physical Layer Protocol Data Unit) |
| First FEC coding input | First FEC decoding output | Information sequence having CRC added thereto, information sequence having padding bit added thereto |
| First FEC coding output | First FEC decoding input Second FEC decoding output (case where puncturing and depuncturing are not performed) | Code Block, Coded Block, Unit of depuncturing in present embodiment |
| Second FEC coding input | Second FEC decoding output | Code Block, Coded Block |
| Second FEC coding output | Second FEC decoding input | Codeword |

Figure 4:
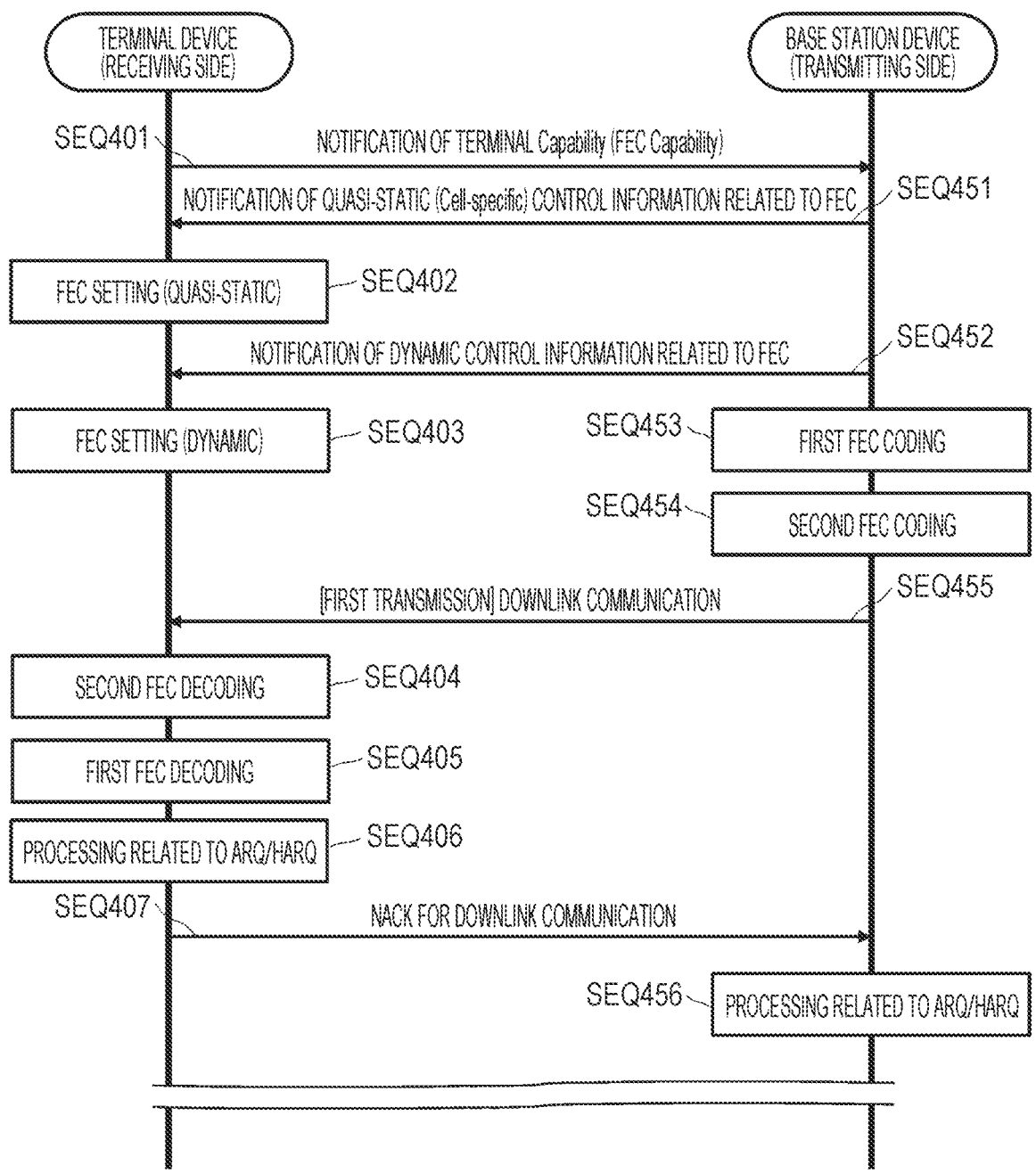
FIG. 4 is a diagram illustrating the procedure (first half) of FEC and HARQ.
Figure 5:
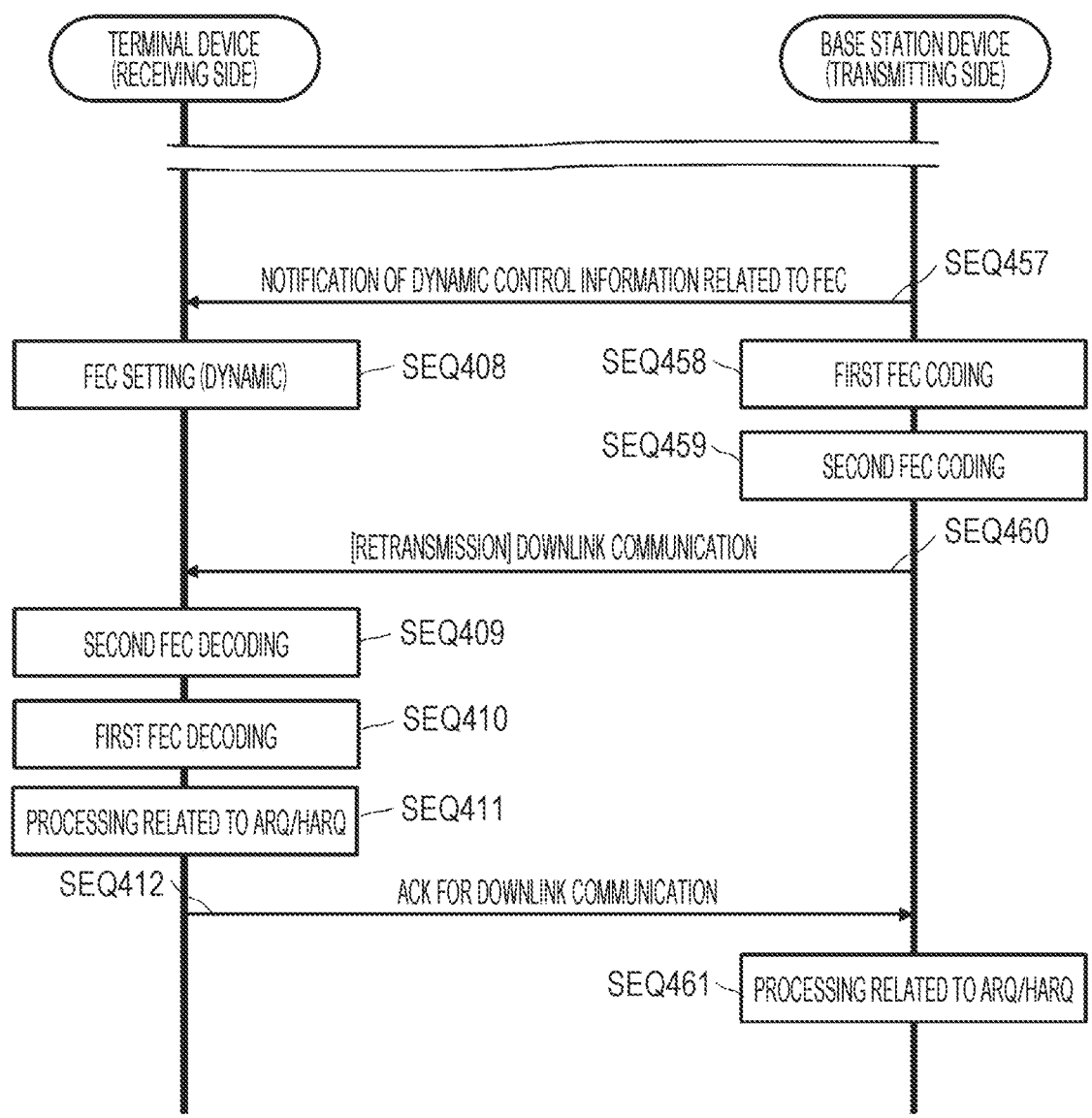
FIG. 5 is a diagram illustrating the procedure (second half) of FEC and HARQ.

FIGS. 4 and 5 illustrate the procedures of FEC and HARQ in a communication system according to the present embodiment. The figures show a procedure in which FEC and HARQ are implemented by the base station device as the transmitting side and the terminal device connected to the cell of the base station device as the receiving side in the process of downlink communication.

First, the terminal device notifies the base station device of a cell connected with the terminal device itself of information regarding the terminal capability of the terminal device itself (SEQ401). This capability information also includes information regarding the capability of the first FEC and the capability of the second FEC. The notification of information regarding the terminal capability is given during the initial access procedure or after the initial access procedure. At least any one of a random access channel (PRACH: Physical Random Access Channel), an uplink control channel (PUCCH: Physical Uplink Control Channel), or an uplink shared channel (PUSCH: Physical Uplink Shared Channel) is used as a physical channel for notification.

The base station device notifies the terminal device connected with a cell managed by the base station device itself of quasi-static control information including information regarding the first FEC and the second FEC (SEQ451). This quasi-static control information may be cell-specific control information. The notification of this control information is given during the initial access procedure or after the initial access procedure. Furthermore, notification of this control information may be given as a part of the radio resource control (RRC) procedure such as RRC Signaling or RRC Configuration. Furthermore, notification of this control information may be periodically given from the base station device to the terminal device. At least any one of a broadcast channel (PBCH: Physical Broadcast Channel), a downlink control channel (PDCCH: Physical Downlink Control Channel, EPDCCH: Enhanced PDCCH), or a downlink shared channel (PDSCH: Physical Downlink Shared Channel) is used as a physical channel for notification of this control information.

The terminal device implements quasi-static setting of FEC of the terminal device itself on the basis of the quasi-static control information regarding FEC, notification of which has been given from the base station device (SEQ402).

Thereafter, in a case where downlink communication occurs specifically from the base station device to the terminal device (for example, a case where the terminal device requests data download (pull) or a case where push data to the terminal device occurs, etc.), notification of control information (dynamic control information) such as a radio resource used for downlink communication is given from the base station device to the terminal device (SEQ452). This dynamic control information may be terminal-specific (user equipment (UE)-specific) or terminal group-specific (UE-group-specific) control information. The terminal group mentioned here corresponds to, for example, a group of one or more terminal devices to be transmitted in a case where downlink communication is multicast or broadcast. Furthermore, the dynamic control information mentioned here includes a frequency resource (e.g., a resource block, a subcarrier, a subcarrier group, etc.) that allocates downlink communication to the target terminal device (or terminal group), a time resource (e.g., a subframe, a slot, a mini-slot, a symbol, etc.), a spatial resource (e.g., an antenna, an antenna port, a spatial layer, a spatial stream, etc.), a non-orthogonal resource (a power resource, an interleave pattern) of non-orthogonal multiple access (NOMA), multiuser superposition transmission (MUST), interleave division multiple access (IDMA), and code division multiple access (CDMA), a modulation order, information regarding the code rate of the second FEC (MCS: Modulation and Coding Set), information regarding the coding method and the code rate of the first FEC, information regarding the code rate of the second FEC, setting regarding ARQ/HARQ (new data indication (NDI)), redundancy version (RV), etc.), and the like.

The terminal device makes setting to prepare for appropriate reception of downlink communication according to the dynamic control information received from the base station device (SEQ403).

Thereafter, the base station device implements the first FEC coding (SEQ453), the second FEC coding (SEQ454), and modulation processing for data of downlink communication to the terminal device so as to match the control information, notification of which has been given to the terminal device. Then, the base station device transmits the coded and modulated data as a radio signal to the terminal device (SEQ455).

The terminal device implements demodulation and decoding processing including the second FEC decoding (SEQ404) and the first FEC decoding (SEQ405) of a radio signal from the base station device according to the above-described setting specified in the control information. Then, the terminal device implements processing related to ARQ or HARQ depending on whether data decoding has succeeded or failed (SEQ406), and returns ACK or NACK for downlink communication to the base station (SEQ407). In the example shown in FIG. 4, since an error has occurred in the received data, the terminal device returns NACK for downlink communication to the base station device.

It is desirable to change the setting of ARQ/HARQ processing depending on whether data decoding has succeeded or failed on the terminal device side (or receiving side). For example, in a case where decoding has failed on the receiving side, it is desirable that the decoding result or data in the process of decoding on the receiving side (soft decision value (soft information, soft decision information), log likelihood ratio (LLR), etc.) is stored in a memory in order to implement retransmission and synthesis of the next HARQ on the transmitting side.

The base station device executes the processing to be implemented next, according to the ACK/NACK received from the terminal device (SEQ456). For example, in a case where the base station device receives the NACK notification from the terminal device, the base station device implements preparation for retransmission of ARQ/HARQ. Examples of this preparation for retransmission include RV selection, MCS selection, radio resource selection, and the like. Furthermore, in a case where the base station device receives ACK notification from the terminal device, it means that the target data has been transmitted/received without any problem, and therefore the processing shifts to communication of the next new data without performing the preparation for retransmission described above.

The base station device shifts to retransmission or implementation of downlink communication of new data according to the processing of ARQ/HARQ corresponding to ACK or NACK received from the terminal device. Therefore, the base station device notifies the terminal device of control information (dynamic control information) such as a radio resource used for downlink communication again (SEQ457). Then, the terminal device makes setting to prepare for appropriate reception for downlink communication according to the dynamic control information received from the base station device (SEQ408).

The base station device implements the first FEC coding (SEQ458), the second FEC coding (SEQ459), and modulation processing for the data of downlink communication to the terminal device so as to match the control information, notification of which has been given to the terminal device. Then, the base station device transmits (retransmits in the example shown in FIG. 5) the coded and modulated data as a radio signal to the terminal device (SEQ460).

The terminal device implements demodulation and decoding processing including the second FEC decoding (SEQ409) and the first FEC decoding (SEQ410) of a radio signal from the base station device according to the above-described setting specified in the control information. Then, the terminal device implements processing related to ARQ or HARQ (SEQ411) depending on whether decoding of retransmitted data has succeeded or failed, and returns ACK or NACK for downlink communication to the base station (SEQ412). In the example shown in FIG. 4, since no error has occurred in the received data at the time of retransmission, the terminal device returns ACK for downlink communication to the base station device.

The base station device executes the processing to be implemented next, according to ACK/NACK received from the terminal device (SEQ461). Here, since the base station device receives the ACK notification from the terminal device, the base station device shifts to communication of the next new data.

The base station device shifts to retransmission or implementation of downlink communication of new data, according to the processing of ARQ or HARQ corresponding to ACK and NACK received from the terminal device. Therefore, the base station device notifies the target terminal device of the dynamic control information again, and repeatedly executes the downlink communication according to the setting in a manner similar to that described above.

C. Details of Transmission Processing and Coding Processing

Then, the details of the transmission processing in a communication system according to the present embodiment will be described.

Figure 6:
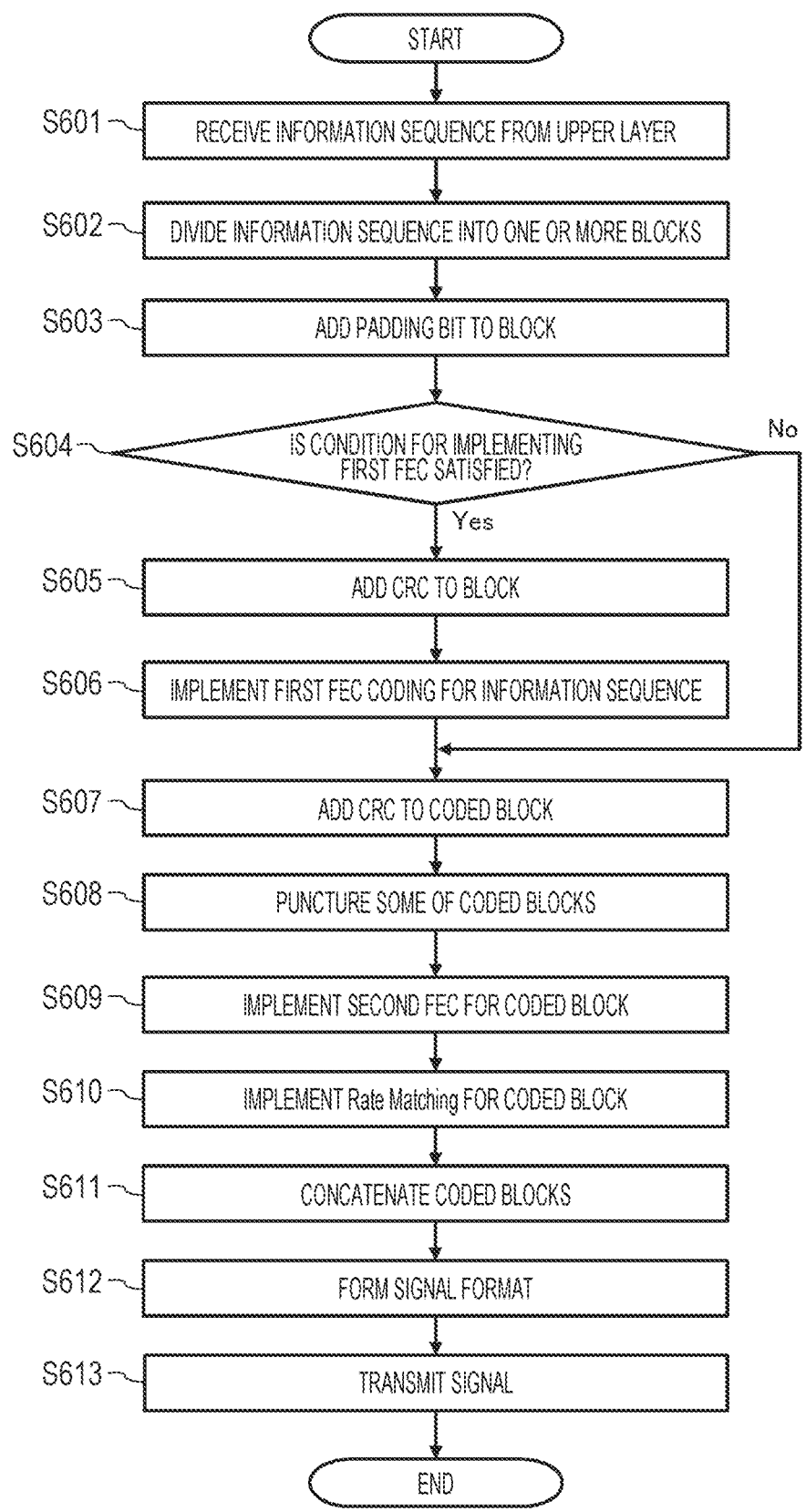
FIG. 6 is a flowchart showing a detailed processing procedure of transmission processing.

FIG. 6 shows a detailed processing procedure of the transmission processing in the form of a flowchart. The illustrated processing procedure shall be implemented by the base station device at the time of downlink communication and implemented by the terminal device at the time of uplink communication.

The transmitting side communication device first receives an information sequence to be transmitted/received from the upper layer (step S601). The process is implemented by, for example, the first transmission processing unit 201.

A transport block, a media access control (MAC) physical data unit (MPDU), a physical layer service data unit (PSDU), a MAC service data unit (MSDU), and the like can be applicable as the information sequence from the upper layer.

Next, the transmitting side communication device implements division of an information sequence received from an upper layer as first transmission processing (step S602). The process is implemented by, for example, the first transmission processing unit 201.

As a procedure for dividing an information sequence, a cyclic redundancy check (CRC) bit sequence is first added to the information sequence, and the information sequence having CRC added thereto is divided into a predetermined number of blocks. Note that another error detection code sequence having an error correction capability may be added instead of a CRC bit sequence. Here, it is assumed that an information sequence is divided into L pieces, and the data size of the l-th block is $D_l$ bit. The data sizes of the blocks obtained by division may be different or may be equal. Although the processing procedure shown in FIG. 6 includes a process of switching whether to implement the first FEC coding or not (step S604 described later), it is desirable that the data sizes of the blocks are equal in a case where the first FEC coding is to be implemented.

In a case where the data sizes of the blocks are equal, a padding bit is added to each block so that the data sizes become equal even if a fraction occurs (step S603). The process is implemented by, for example, the first transmission processing unit 201.

However, a method of adding padding bits to blocks may be a method of adding the padding bits to the respective blocks substantially evenly, or a method of collectively adding the padding bits to a specific block (e.g., the L-th block). In a case where the data sizes of the blocks are to be equal to D bit, $(D-D_l-D_{CRC})$ bit will be added to the l-th block. In a case where the data sizes of the blocks are already equal before the padding bits are added, it is not necessary to add the padding bits. After a padding bit is added, the CRC bit sequence (data size $D_{CRC}$) may be added to each block (step S605) before the first FEC coding (step S606).

Figure 7:
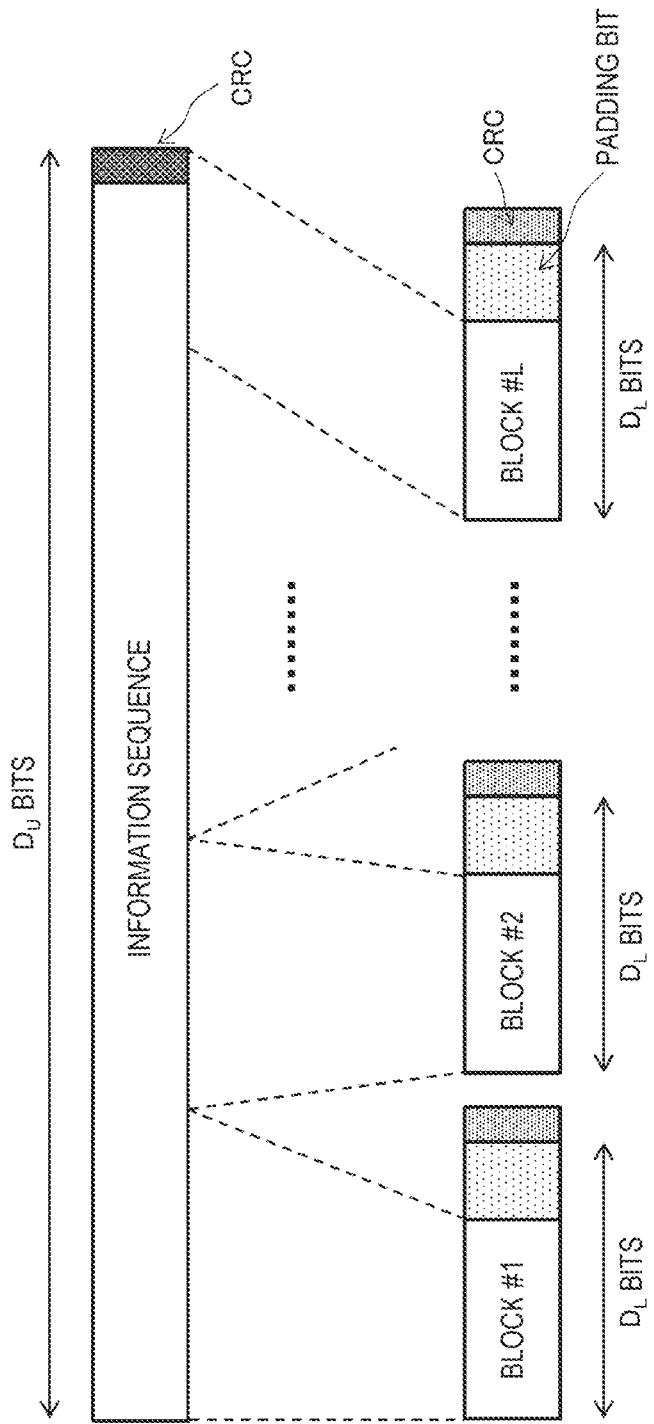
FIG. 7 is a diagram showing how an information sequence is divided and a padding bit and CRC are added to each block.

FIG. 7 shows how an information sequence (obtained after adding CRC) is divided and a padding bit and CRC are added to each block in step S603 described above. As described above, the original information sequence and the CRC bit sequence are added, so that the data size becomes $D_u$ bit. Then, the information sequence having a CRC bit sequence added thereto is divided into L blocks #1 to #L. Moreover, padding bits are added to the blocks #1 to #L substantially evenly, and the data size of each block becomes $D_L$. Thereafter, a CRC bit sequence is further added to each of the blocks #1 to #7.

Furthermore, as another example of the first transmission processing, the content of the first transmission processing of a case where the first FEC is implemented and the content of the first transmission processing of a case where the first FEC is not implemented may be completely separated with other procedures. For example, whether block division is performed or not, the method of determining the data of a block to be divided, whether there is a padding bit or not, or the like may be changed in relation to whether the first FEC is implemented or not.

The procedure of the transmission processing will be described continuously with reference to FIG. 6 again. After the first transmission processing (steps S602 to S603), the first FEC coding is implemented. In the processing procedure shown in FIG. 6, whether to implement the first FEC coding or not is first determined (step S604). Since overhead due to implementation of the first FEC may occur, it is not always a good idea to always implement the first FEC. Therefore, in the processing procedure shown in FIG. 6, a dynamic response according to the requirement condition of quality of service is realized by switching implementation of the first FEC according to the application.

Figure 8:
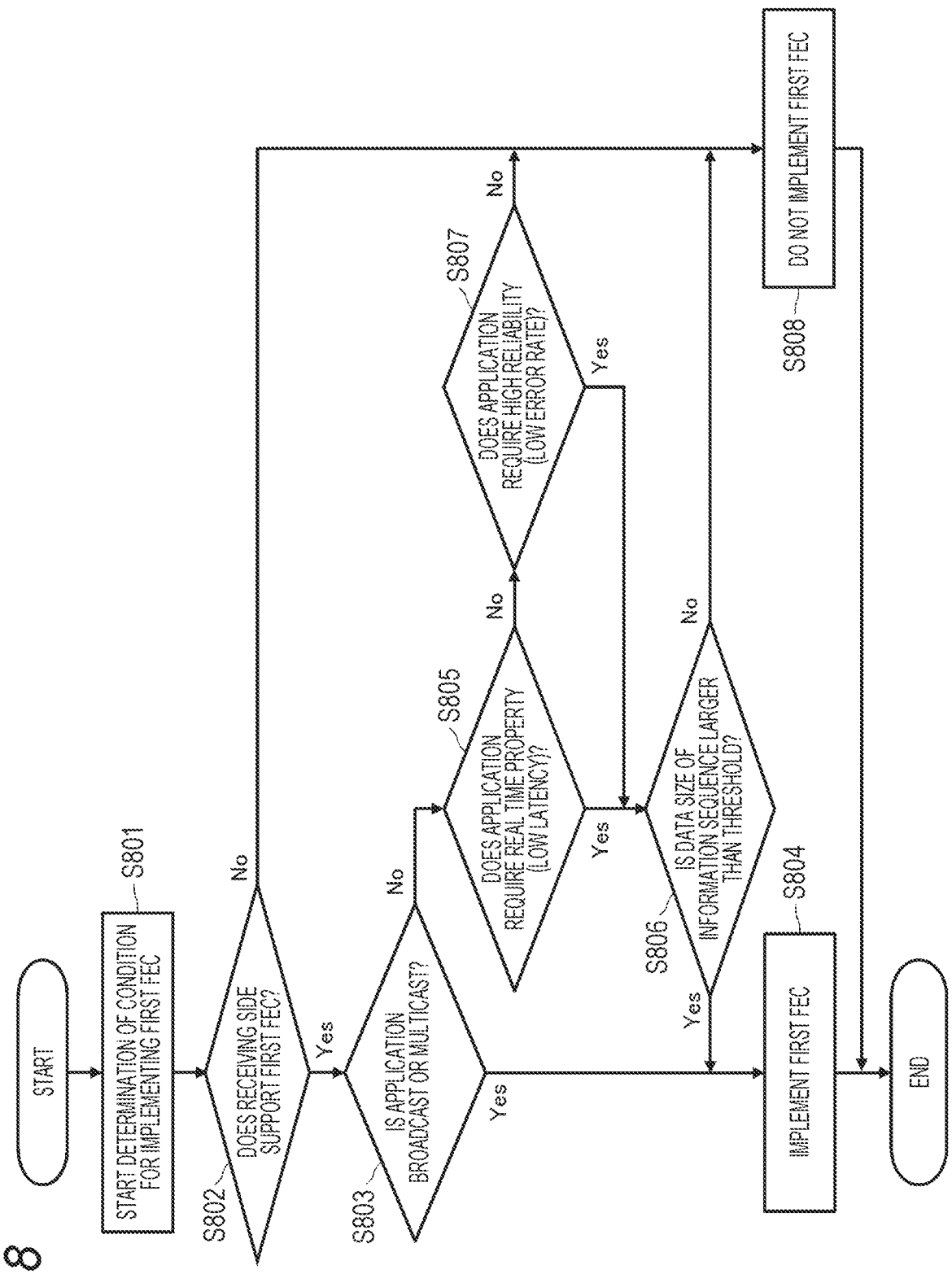
FIG. 8 is a flowchart showing a detailed processing procedure for determining whether to implement first FEC coding or not.

FIG. 8 shows a detailed processing procedure for determining whether to implement the first FEC coding, which is implemented in step S604 in the flowchart shown in FIG. 6, or not in the form of a flowchart. This determination processing is implemented by, for example, the first transmission processing unit 201 or the first FEC coding unit 202.

When the transmitting side communication device starts determination of the condition for implementing the first FEC (step S801), whether the receiving side communication device supports the first FEC or not is first checked (step S802). In a case where the transmitting side communication device transmits data to a plurality of communication devices, whether all the receiving side communication devices support the first FEC or not is checked.

In a case where any one of the receiving side communication devices does not support the first FEC (No in step S802), the transmitting side communication device determines that the first FEC is not to be implemented (step S808) and terminates this processing.

In a case where all receiving side communication devices support the first FEC (Yes in step S802), the transmitting side communication device then checks whether the application of the target information sequence is broadcast or multicast or not (step S803). In a case where the application of the target information sequence is broadcast or multicast (Yes in step S803), the transmitting side communication device determines that the first FEC is to be implemented (step S804) and terminates this processing.

On the other hand, in a case where the application of the target information sequence is neither broadcast nor multicast (No in step S803), the transmitting side communication device then checks whether the application (QCI: Quality of Service (QoS) Class Indicator) of the target information sequence requires real time property (or low latency) or not (step S805).

In a case where the application (QCI) of the target information sequence requires real time property (low latency) (Yes in step S805), the transmitting side communication device then checks whether the data size of the target information sequence is larger than a predetermined threshold or not (step S806).

Furthermore, in a case where the application (QCI) of the target information sequence does not require real time property (low latency) (No in step S805), the transmitting side communication device further checks whether the application (QCI) of the target information sequence requires high reliability (low error rate) or not (step S807). In a case where the application (QCI) of the target information sequence requires high reliability (low error rate) (Yes in step S807), the transmitting side communication device then checks whether the data size of the target information sequence is larger than a predetermined threshold or not (step S806).

In a case where the data size of the target information sequence is larger than the predetermined threshold (Yes in step S806), the transmitting side communication device determines that the first FEC is to be implemented (step S804) and terminates this processing.

Furthermore, in a case where the data size of the target information sequence is equal to or smaller than the predetermined threshold (No in step S806) or in a case where the application (QCI) of the target information sequence does not require high reliability (low error rate) (No in step S807), the transmitting side communication device determines that the first FEC is not to be implemented (step S808) and terminates this processing.

Figure 9:
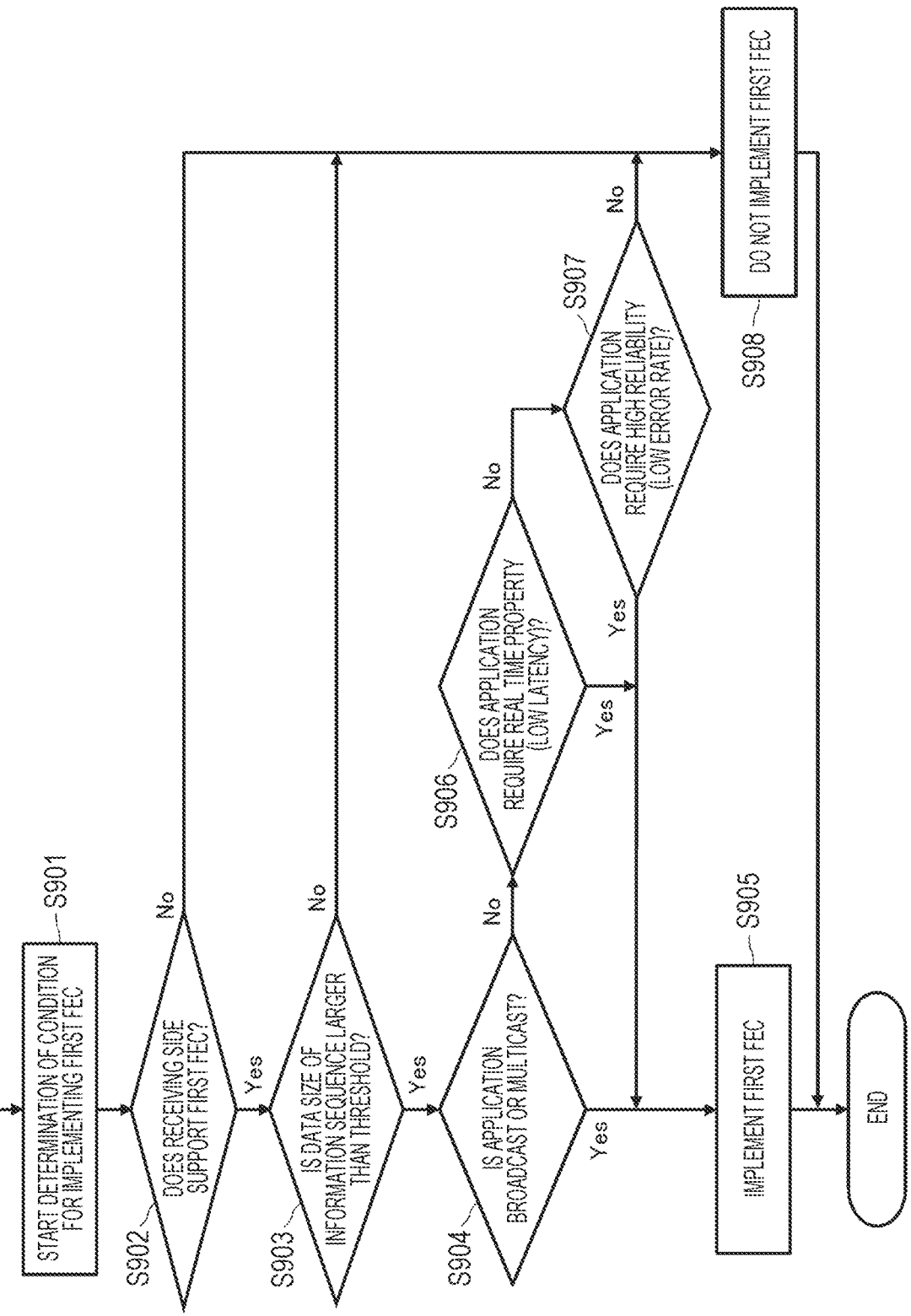
FIG. 9 is a flowchart showing a detailed processing procedure for determining whether to implement the first FEC coding or not.

Furthermore, FIG. 9 shows another example of a processing procedure for determining whether to implement the first FEC coding, which is implemented in step S604 in the flowchart shown in FIG. 6, or not in the form of a flowchart. This determination processing is implemented by, for example, the first transmission processing unit 201 or the first FEC coding unit 202.

When the transmitting side communication device starts determining the condition for implementing the first FEC (step S901), whether the receiving side communication device supports the first FEC or not is first checked (step S902). In a case where the transmitting side communication device transmits data to a plurality of communication devices, whether all the receiving side communication devices support the first FEC or not is checked.

In a case where any one of the receiving side communication devices does not support the first FEC (No in step S902), the transmitting side communication device determines that the first FEC is not to be implemented (step S908) and terminates this processing.

In a case where all receiving side communication devices support the first FEC (Yes in step S902), the transmitting side communication device then checks whether the data size of the target information sequence is larger than a predetermined threshold or not (step S903).

In a case where the data size of the target information sequence is equal to or smaller than the predetermined threshold (No in step S903), the transmitting side communication device determines that the first FEC is not to be implemented (step S908) and terminates this processing.

On the other hand, in a case where the data size of the target information sequence is larger than the predetermined threshold (Yes in step S903), the transmitting side communication device then checks whether the application of the target information sequence is broadcast or multicast or not (step S904). In a case where the application of the target information sequence is broadcast or multicast (Yes in step S904), the transmitting side communication device determines that the first FEC is to be implemented (step S905) and terminates this processing.

Furthermore, in a case where the application of the target information sequence is neither broadcast nor multicast (No in step S904), the transmitting side communication device then further checks whether the application (QCI) of the target information sequence requires real time property (or low latency) or not (step S906). In a case where the application (QCI) of the target information sequence requires real time property (low latency) (Yes in step S906), the transmitting side communication device determines that the first FEC is to be implemented (step S905) and terminates this processing.

In a case where the application (QCI) of the target information sequence does not require real time property (low latency) (No in step S906), the transmitting side communication device further checks whether the application (QCI) of the target information sequence requires high reliability (low error rate) or not (step S907). In a case where the application (QCI) of the target information sequence requires high reliability (low error rate) (Yes in step S907), the transmitting side communication device determines that the first FEC is to be implemented (step S905) and terminates this processing.

In a case where the application (QCI) of the target information sequence does not require high reliability (low error rate) (No in step S907), the transmitting side communication device determines that the first FEC is not to be implemented (step S908) and terminates this processing.

To summarize the processing procedures shown in FIGS. 8 and 9, the transmitting side communication device determines whether to implement the first FEC coding or not in view of the following conditions (i) to (iii).

(i) Status of receiving side communication device
(ii) Application and requirement of target information sequence
(iii) Status of target information sequence A condition of the status of the receiving side communication device is that the receiving side communication device supports the first FEC. In the case of broadcast or multicast, there will be a receiving side communication device that cannot decode the received information sequence if not "all" receiving side communication devices support the first FEC. Therefore, it is desirable not to implement the first FEC in a case where there is at least one receiving side communication device that does not support the first FEC.

Regarding the application and requirement of the target information sequence, it is desirable to implement the first FEC in a case where the target application is broadcast or multicast, for example. In the case of broadcast or multicast, an error may occur only for the second FEC (implemented in the subsequent stage), and it is difficult to implement retransmission in that case. Accordingly, it becomes possible to improve the reliability of broadcast or multicast by increasing the error correction capability by the first FEC.

Furthermore, it is also desirable to implement the first FEC in a case where the target application requires real time property (low latency) or high reliability (low error rate (bit error rate (BER), block error rate (BLER), packet error rate (PER), frame error rate (FER), etc.)). This is because the effect of reducing errors that cannot be removed by error correction of the second FEC alone or of reducing the delay due to retransmission control due to errors can be expected by implementing the first FEC.

Regarding the status of the target information sequence, the first FEC shall be implemented in a case where the data size of the information sequence is larger than a predetermined size (the number of bits or bytes) (or equal to or larger than a predetermined size), for example. In a case where the size is smaller than a predetermined size, there is a concern that the effect of the first FEC, especially the erasure code, may become small, and therefore the influence of the demerits of the overhead required for the first FEC (coding time on the transmitting side, decoding time on the receiving side, notification of control information for the first FEC, etc.) becomes large, and it may be desirable to determine that the first FEC is not to be implemented.

In the present embodiment, QCI can be considered as a reference and as a requirement condition for the application. The QCI is a parameter that is linked with each target information sequence, each application associated with a target information sequence, each session, or each bearer and is shown so as to achieve the quality of service (QoS) to be required in the process of transmitting and receiving the information sequence. Table 4 below shows the elements of QCI and the conditions for determining whether the first FEC is implemented or not for each element.

TABLE 4

| Element of QCI | Specific content | Condition for implementing first FEC |
|---|---|---|
| Resource Type | GBR or Non-GBR | Implementation in case where GBR is requested (or implement first FEC always) |
| Priority | High, Medium, Low | Implementation in case of High or Medium (or implement first FEC always) |
| Reliability | Transport factor of information sequence (100% - information sequence error rate) | Implementation in case where reliability equal to or higher than 99.999% is required |
| Latency (Real-time) | Delay time for passing information sequence from layer 2 to layer 3 Delay time of END-to-END (E2E) | Implementation in case where delay time equal to or shorter than 1 millisecond is required |

In the present embodiment, it is desirable to determine whether the first FEC is implemented or not, especially for the requirements of reliability and latency (Real Time). Alternatively, in addition to reliability and latency, whether the first FEC is implemented or not may be determined for the resource type (guaranteed bit rate (GBR), non-GBR) or priority.

Furthermore, in the present embodiment, the first FEC may be mapped to a bearer. For example, in a certain bearer, the same first FEC coding method, code rate, block size, and the like shall be commonly used. In this way, it becomes possible to manage or handle the quality condition collectively with a bearer as a unit.

The procedure of the transmission processing will be described continuously with reference to FIG. 6 again. In a case where it is determined in step S604 that the first FEC is to be implemented, the transmitting side communication device adds CRC to each block obtained by dividing the target information sequence (see FIG. 7) (step S605), implements the first FEC using the blocks obtained by division (step S606), and adds CRC to each coded block (step S607). The first FEC coding processing is implemented by the first FEC coding unit 202.

Figure 10:
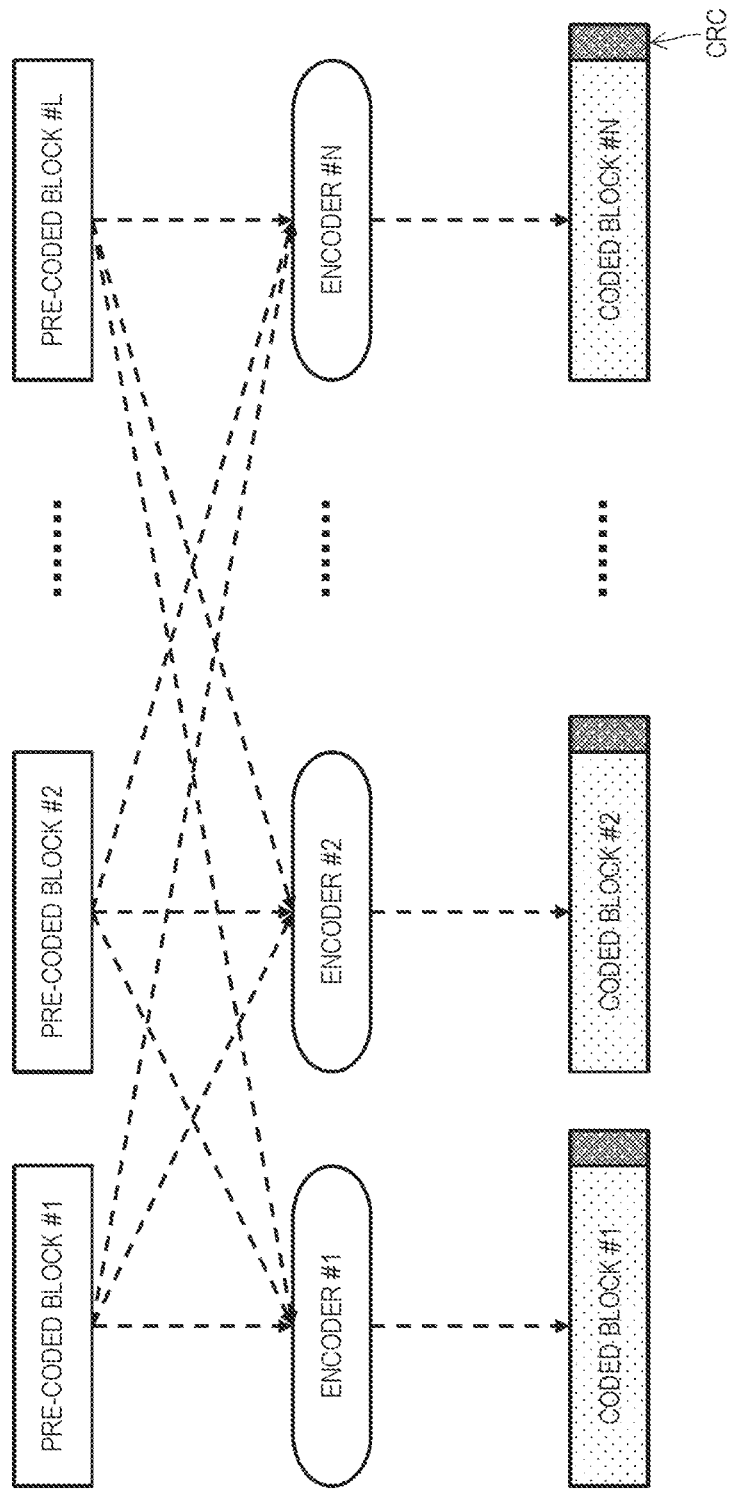
FIG. 10 is a diagram showing how the first FEC coding is implemented on an information sequence divided into blocks and CRC is added to each coded block.

The first FEC coding generates N coded blocks from L pre-coded blocks (blocks including padding bits, CRC, etc.). FIG. 10 illustrates how the first FEC coding is implemented for the information sequence divided into blocks (step S606) and CRC is added to each coded block (step S607). Here, it is desirable that N=L+P and P<L≤N are satisfied. Furthermore, it is desirable that the data size of a pre-coded block and the data size of a coded block are the same size (D bit in FIG. 10). The code rate r of the first FEC is as expressed in the following equation (1). This code rate r may be predetermined depending on the FEC code adopted.

[Math. 1]

$$r = \frac{L}{N} = \frac{L}{L+P} \qquad (1)$$

The encoder in FIG. 10 will be described in detail. The i-th bit $b_l(i)$ of the l-th pre-coded block is as expressed in the following equation (2).

[Math. 2]

$$b_l(i) \in \{0,1\}, (i=1, \ldots, D) \qquad (2)$$

Then, a coded block is generated as expressed in the following equation (4), assuming that the n-th coded block (output of the n-th encoder #n) $d_n$ is as expressed in the following equation (3).

[Math. 3]

$$d_n(i) \in \{0,1\}, (i=1, \ldots, D) \qquad (3)$$

[Math. 4]

$$d_n(i) = c_{n,1}(i)b_1(i) \oplus c_{n,2}(i)b_2(i) \oplus \ldots \oplus c_{n,L}(i)b_L(i) \qquad (4)$$

However, $c_{n,l}(i)$, (i=1, ..., D, n=1, ..., L) in the above equation (4) is a weighting factor for the l-th pre-coded block of the n-th encoder #n (the l-th input to the n-th encoder #n). For example, the values that $c_{n,l}(i)$ can take are as expressed in the following equation (5).

[Math. 5]

$$c_{n,l}(i) \in \{0,1\} \qquad (5)$$

Furthermore, the operator (enclosed character of the symbol "+") in the above equation (4) means the operation in an encoder. It is desirable that this operation is, for example, any one of XOR (addition of Mod 2), OR, or AND. Examples of XOR, OR, and AND operations are shown respectively in Tables 5, 6, and 7.

TABLE 5

Example of XOR operation

| a | b | a ⊕ b |
|---|---|-------|
| 0 | 0 | 0 |
| 0 | 1 | 1 |
| 1 | 0 | 1 |
| 1 | 1 | 0 |

TABLE 6

Example of OR operation

| a | b | a ⊕ b |
|---|---|-------|
| 0 | 0 | 0 |
| 0 | 1 | 1 |
| 1 | 0 | 1 |
| 1 | 1 | 1 |

TABLE 7

Example of AND operation

| a | b | a ⊕ b |
|---|---|-------|
| 0 | 0 | 0 |
| 0 | 1 | 0 |
| 1 | 0 | 0 |
| 1 | 1 | 1 |

The procedure of the transmission processing will be described continuously with reference to FIG. 6 again. After first FEC is implemented in step S606 and CRC is added to each coded block in step S607, puncturing of the coded block is implemented (step S608). The processes according to steps S607 and S608 are implemented by, for example, the second transmission processing unit 203. In this embodiment, block-based puncturing is applied. Bitwise puncturing already exists. On the other hand, in the present embodiment, since a block becomes the correction unit of the first FEC in consideration of the coding method adopted to the first FEC coding, it can be said that it is desirable to implement puncturing with a block as a unit as well. By puncturing, some of coded blocks obtained after first FEC coding are used to implement second FEC coding in the subsequent stage.

It is assumed that K coded blocks of N coded blocks are transmitted as a general system (that is, (N-K) blocks are excluded from the transmission target by puncturing). Here, it is desirable that the value of K is a positive integer that satisfies the following equation (6). Furthermore, it is desirable that the value of K is equal to the number of second FEC encoders (i.e., the number of code blocks) in the subsequent stage (i.e., used in the second FEC coding processing implemented in step S609).

[Math. 6]

$$K \geq \text{floor}\left(\frac{N}{2}\right) \text{ or } K \geq \text{ceil}\left(\frac{N}{2}\right) \qquad (6)$$

Specifically, in the present embodiment, it is desirable to select and puncture a block by any one of the following equations (7) to (9).

(a) Select and puncture j-th block, $$j + \text{floor}\left(\frac{N}{N-K}\right)$$

-th block, $$j + 2\text{floor}\left(\frac{N}{N-K}\right)$$

-th block, . . . , $$j + (N - K - 1)\text{floor}\left(\frac{N}{N - K}\right)$$

-th block (or select and puncture $$j + k \cdot \text{floor}\left(\frac{N}{N - K}\right)$$

-th block. Here, k is an integer within the range of 0≤k≤N−K−1. Here, j is an integer within the range of $$1 \le j \le N - (N - K - 1)\text{floor}\left(\frac{N}{K}\right).$$

The value of j may be shared by the transmitting side and the receiving side. Furthermore, cell( ) (round up) or round( ) (rounding) may be used instead of floor( ) (round down) here.

(b) Select and puncture the (j+N−K−1)-th blocks aligned in series from the j-th block. Here, j is an integer within the range of 1≤j≤K+1. The value of j may be shared by the transmitting side and the receiving side.

(c) Select and puncture K blocks randomly on the transmitting side.

Furthermore, the specific block to be punctured may be determined on the basis of whether it is the first transmission or retransmission. For example, the value of j described above is changed depending on the number of transmissions. In this case, for example, puncturing is implemented with j=t+$t_{offset}$ (however, $t_{offset}$ is a fixed offset value) at the time of the t-th transmission.

As yet another example, a block is reselected each retransmission time in a case where a puncturing block is randomly selected.

Figure 11:
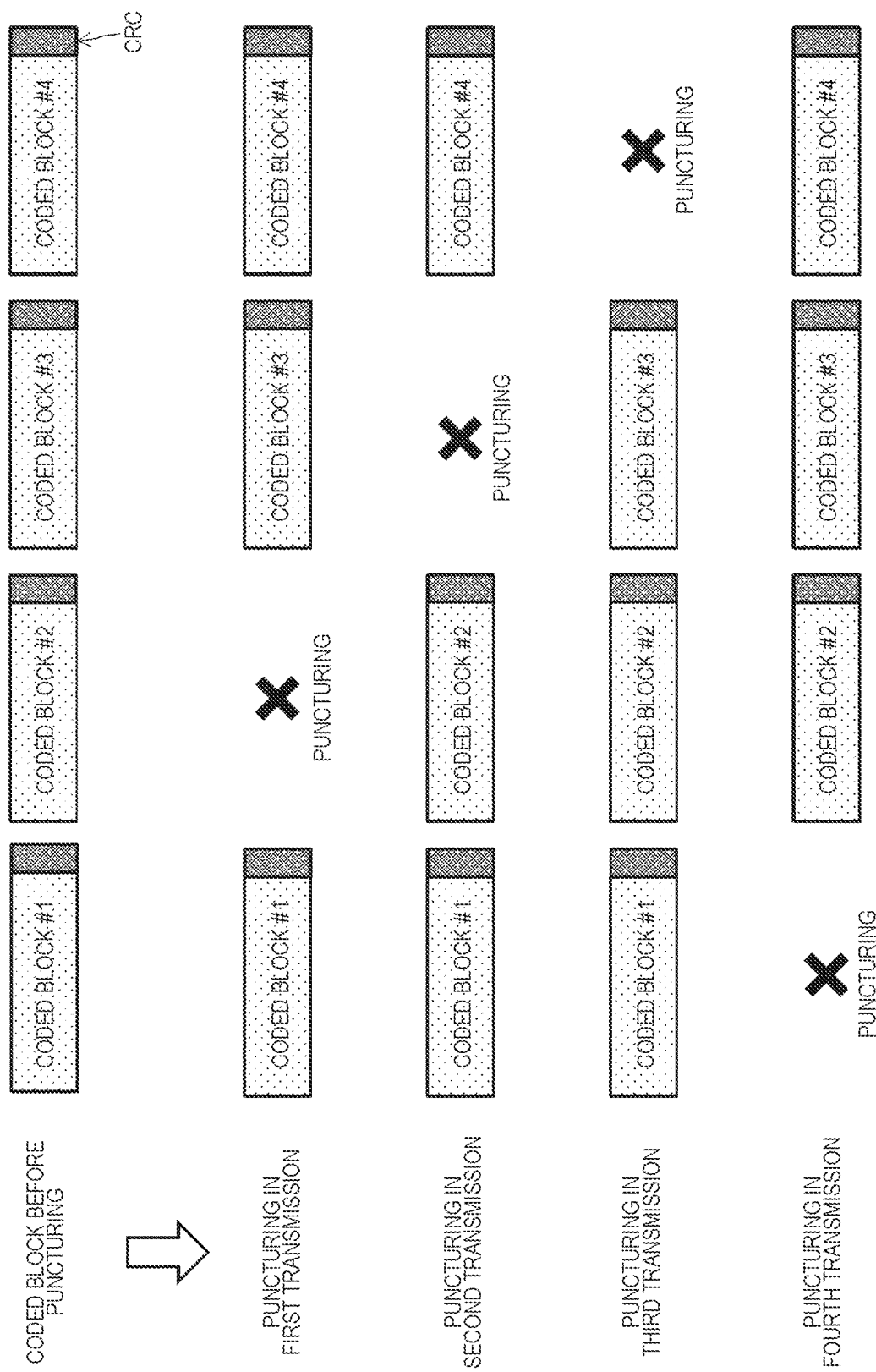
FIG. 11 is a diagram showing an example of puncturing a coded block.

FIG. 11 shows an example of puncturing a coded block. In the illustrated example, the blocks to be punctured are sequentially changed according to the number of transmission times.

In the present embodiment, note that the rules of the method for selecting or determining a block to be punctured described above are known in advance for the transmitting side communication device and the receiving side communication device. Sharing this setting in advance can be realized by, for example, putting information regarding the rule in quasi-static control information or dynamic control information, or by making the setting as a fixed rule (pre-configuration) in advance.

Moreover, in the case of retransmission, a coded block, transmission/reception of which has succeeded in the last time transmission/reception, may be preferentially punctured (in other words, not retransmitted). Furthermore, a coded block that has been punctured in the last time transmission/reception is not preferentially punctured. In any case, retransmission is implemented by a combination of different coded sequences for each transmission time. In this way, it is possible to improve the decoding performance by using the reception results up to the last time when decoding the first FEC. In a case where such a puncturing rule is applied, it is considered that there is no coded block, transmission/reception of which has succeeded, among transmission candidates with respect to the puncturing rule described above. That is, in a case where transmission/reception of $N_{success,t}$ coded blocks of $N_t$ blocks to be transmitted in the t-th transmission succeeds, ($N_t - N_{success,t}$) coded blocks excluding the successful blocks are to be punctured in the (t+1)-th transmission (that is, the number $N_{t+1}$ of blocks to be the target of the (t+1)-th transmission becomes $N_{t+1}=N_t-N_{success,t}$).

Figure 12:
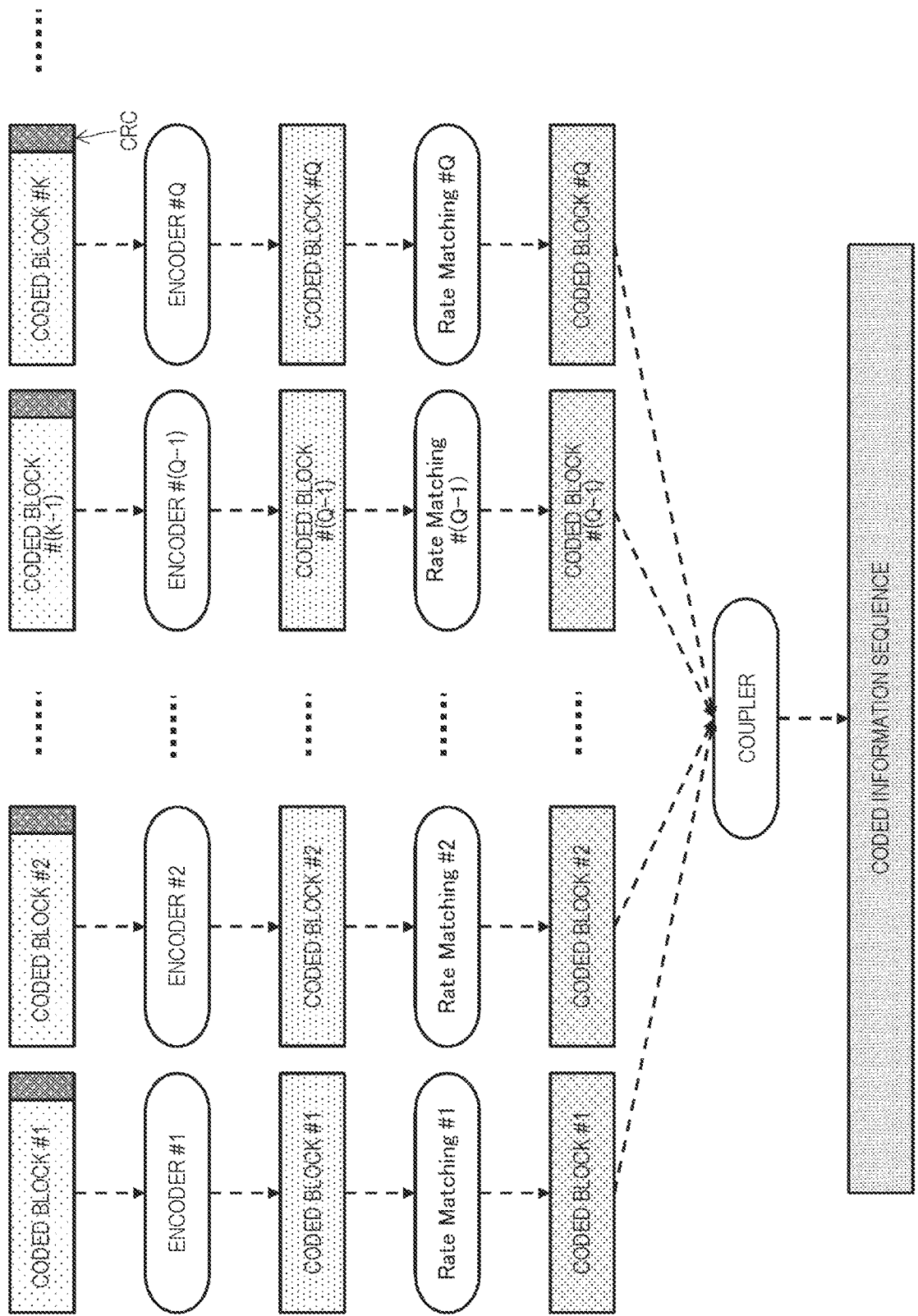
FIG. 12 is a diagram showing the flow of processing related to second FEC coding.

The procedure of the transmission processing will be described continuously with reference to FIG. 6 again. After puncturing is performed by the second transmission processing unit 203 in step S608, for example, the coded block is subjected to the second FEC coding (step S609). Accordingly, some of a plurality of coded sequences obtained after first FEC coding will be punctured, and the other coded sequences will be used for implementing second FEC coding. The second FEC coding is implemented by the second FEC coding unit 204. FIG. 12 shows the flow of processing related to the second FEC coding.

In the present embodiment, the second coding is implemented with a coded block as a unit. Therefore, the number Q of the encoders satisfies Q≥K. In particular, it is desirable that Q=K is satisfied. Furthermore, it is desirable to have a one-to-one mapping between a coded block obtained after puncturing and a second FEC encoder. By associating the second coding in this way, it becomes possible to immediately determine which block causes an error after the second FEC decoding at the time of decoding on the receiving side. For example, it is desirable that the relationship q=k is satisfied in a case where the k-th coded block obtained after puncturing is associated to be inputted to the q-th (second FEC) encoder. Alternatively, it is desirable that the relationship of q=(k+j) mod Q is satisfied.

Note that the rule for mapping the coded block (obtained after puncturing) and the (second FEC) encoder described above shall be known in advance by the transmitting side communication device and the receiving side communication device in the present embodiment. To make this setting known in advance is realized by, for example, putting information regarding the rule into quasi-static control information or dynamic control information, or making setting in advance as a fixed rule (pre-configuration).

As shown in FIGS. 6 and 12, after the second FEC coding is implemented (step S609), rate matching processing is further implemented (step S610). In the rate matching processing, the code rate of the second FEC coding is adjusted. It is desirable that the code rate value adjusted by rate matching is specified in, for example, dynamic control information from the base station device and set on the basis thereof. Furthermore, it is desirable to use a circular buffer as a rate matching method.

After the rate matching processing (step S610), a plurality of coded blocks is inputted to the coupler and concatenated (step S611). As a result of the concatenation, a coded information sequence is outputted. The coded information sequence corresponds to, for example, a codeword. By the rate matching processing described above, some of the coded blocks subjected to the second FEC coding are concatenated, so that the code rate is adjusted. Then, after a predetermined signal format is formed (step S612), the signal is transmitted (step S613). The processes of steps S610 to S613 are implemented by, for example, the third transmission processing unit 205.

D. Details of Reception Processing and Decoding Processing

Then, the details of the decoding processing on the receiving side in a communication system according to the present embodiment will be described.

Figure 13:
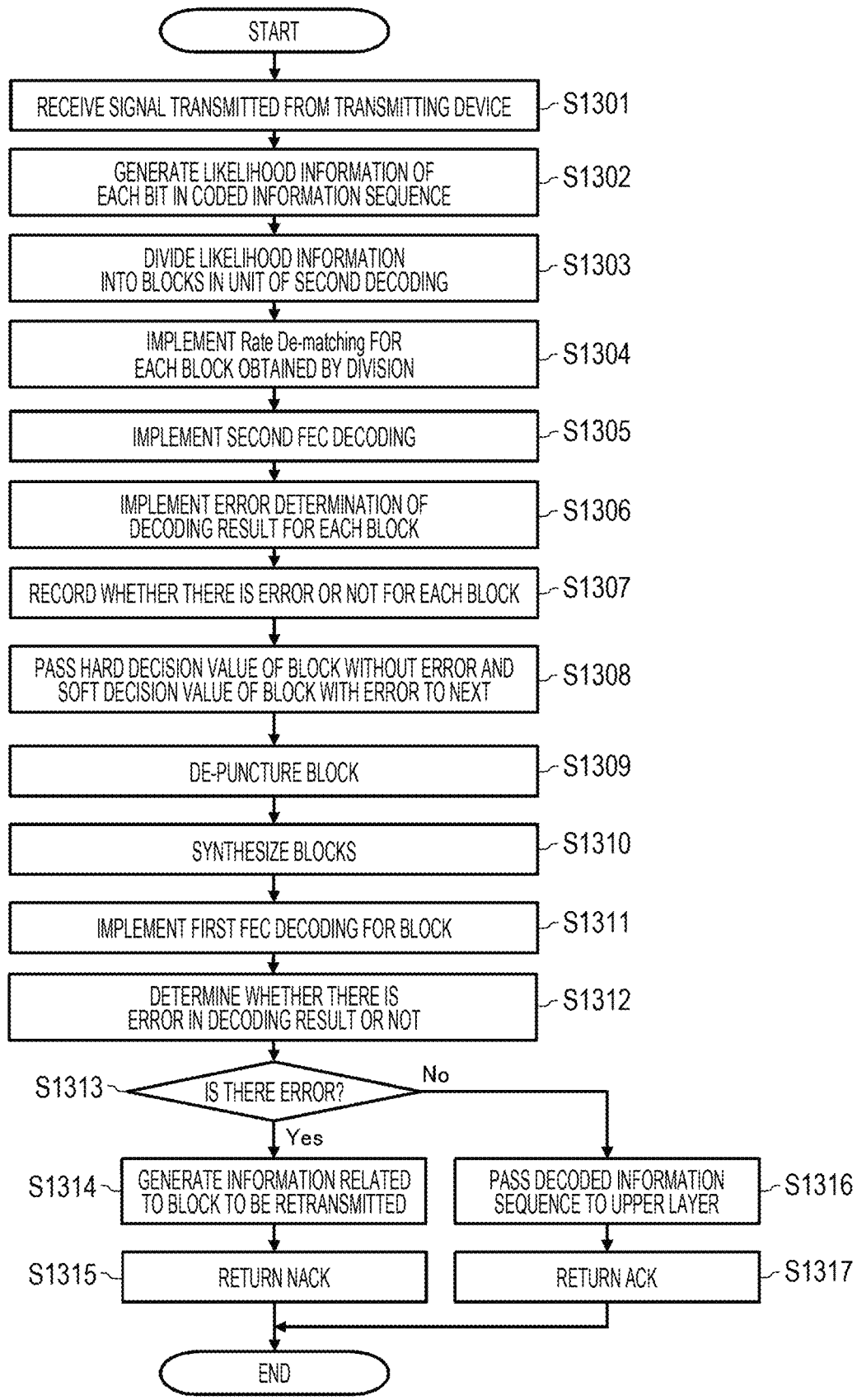
FIG. 13 is a flowchart showing a detailed processing procedure of reception processing.

FIG. 13 shows a detailed processing procedure of the reception processing in the form of a flowchart. The illustrated processing procedure shall be implemented by the terminal device at the time of downlink communication and implemented by the base station device at the time of uplink communication.

After the receiving side communication device receives a signal transmitted from the transmitting side communication device (step S1301), the receiving side communication device generates the likelihood information of each bit of the coded information sequence (e.g., codeword) (step S1302). The likelihood information mentioned here may be a soft decision value, a log likelihood ratio, or the like. The processes of steps S1301 and S1302 are implemented by the first reception processing unit 301.

Next, the receiving side communication device divides the likelihood information of the coded sequence into blocks corresponding to the decoding units of the second FEC decoding in the subsequent stage (step S1303). Then, the receiving side communication device implements rate de-matching corresponding to rate matching on the transmitting side (step S610 in FIG. 6) to readjust the code rate adjusted on the transmitting side (step S1304). The processes of steps S1303 and S1304 are implemented by the first reception processing unit 301.

Here, in a case where retransmission by HARQ is performed for a soft decision value of each block of the signal received this time or a target block, the input of rate de-matching shall be a block obtained by synthesizing or coupling the reception result (soft decision value) of a target block of a signal received up to the last time and a soft decision value of the target block received this time. That is, rate de-matching is implemented for the target block in consideration of the past retransmissions.

After implementing rate de-matching, the receiving side communication device implements second FEC decoding corresponding to the second FEC coding for each block (step S1305). The second FEC decoding processing is implemented by the second FEC decoding unit 302. It is desirable to output both likelihood information obtained after decoding (soft decision value) and a hard decision value obtained after decoding (hard Information, hard decision information, for example, each bit (0 or 1), (−1 or 1), etc. of an information sequence) as the output of the decoder.

When the second FEC decoding is completed, the receiving side communication device determines whether an error has occurred in each block after decoding or not (step S1306). This determination is implemented using the CRC bit sequence added on the transmitting side. Then, whether there is an error in each block or not is recorded (step S1307). The processes of steps S1306 and S1307 are implemented by the second reception processing unit 303.

The receiving side communication device further records the result itself of the second FEC decoding for each block, in addition to whether there is an error or not (step S1308). It is desirable to record both a soft decision value (likelihood information) and a hard decision value (0 or 1, or −1 or 1 for each bit) for bit for the contents of each block as the content to be recorded here. This is because it is used in the first FEC decoding in the subsequent stage in the reception processing according to the present embodiment, and it is used for synthesis or coupling in the rate de-matching described above when it becomes necessary to retransmit HARQ. The process of step S1308 is implemented by the second reception processing unit 303.

Figure 14:
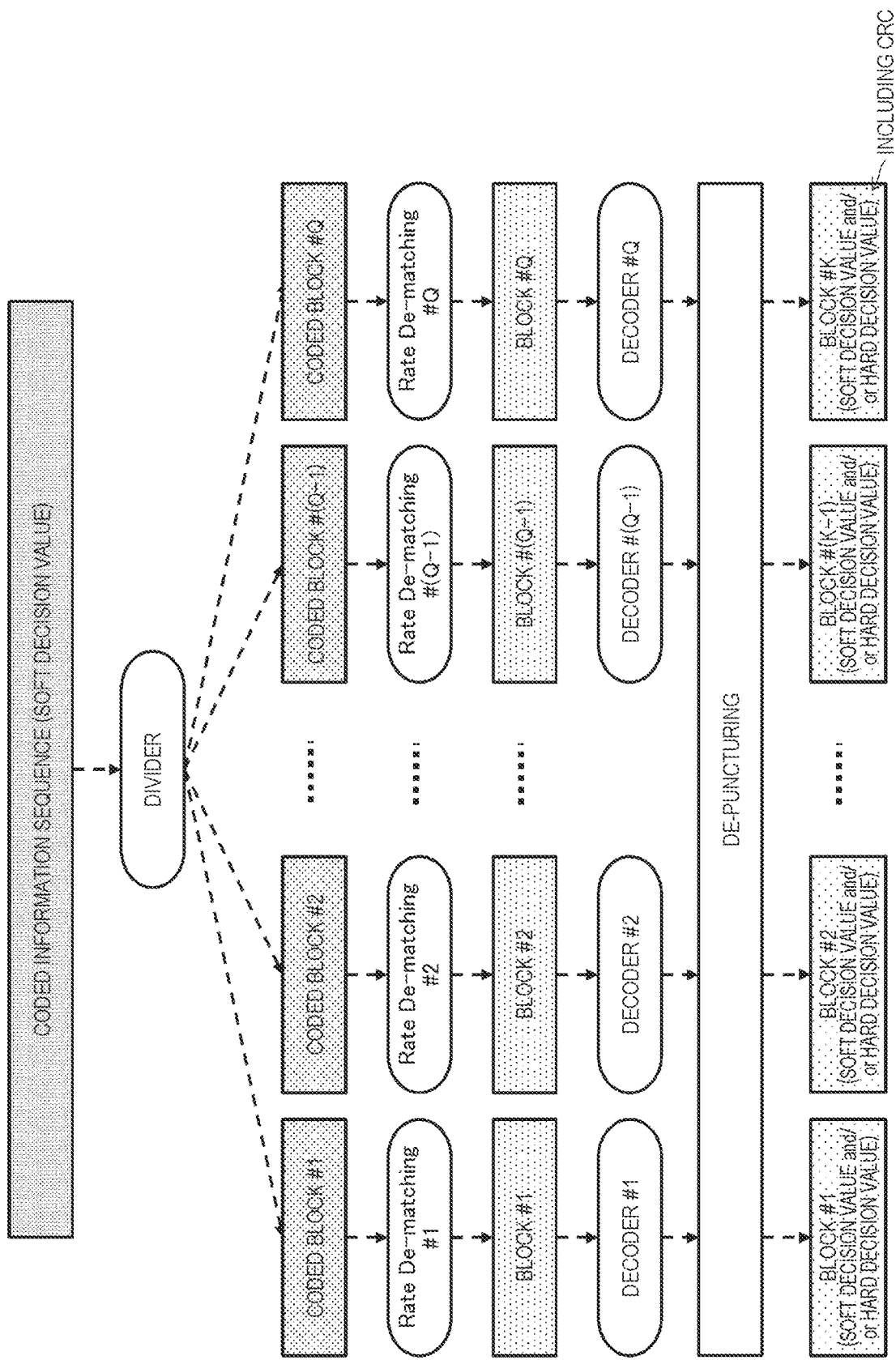
FIG. 14 is a diagram showing the flow of processing related to second FEC decoding on the receiving side.
Figure 15:
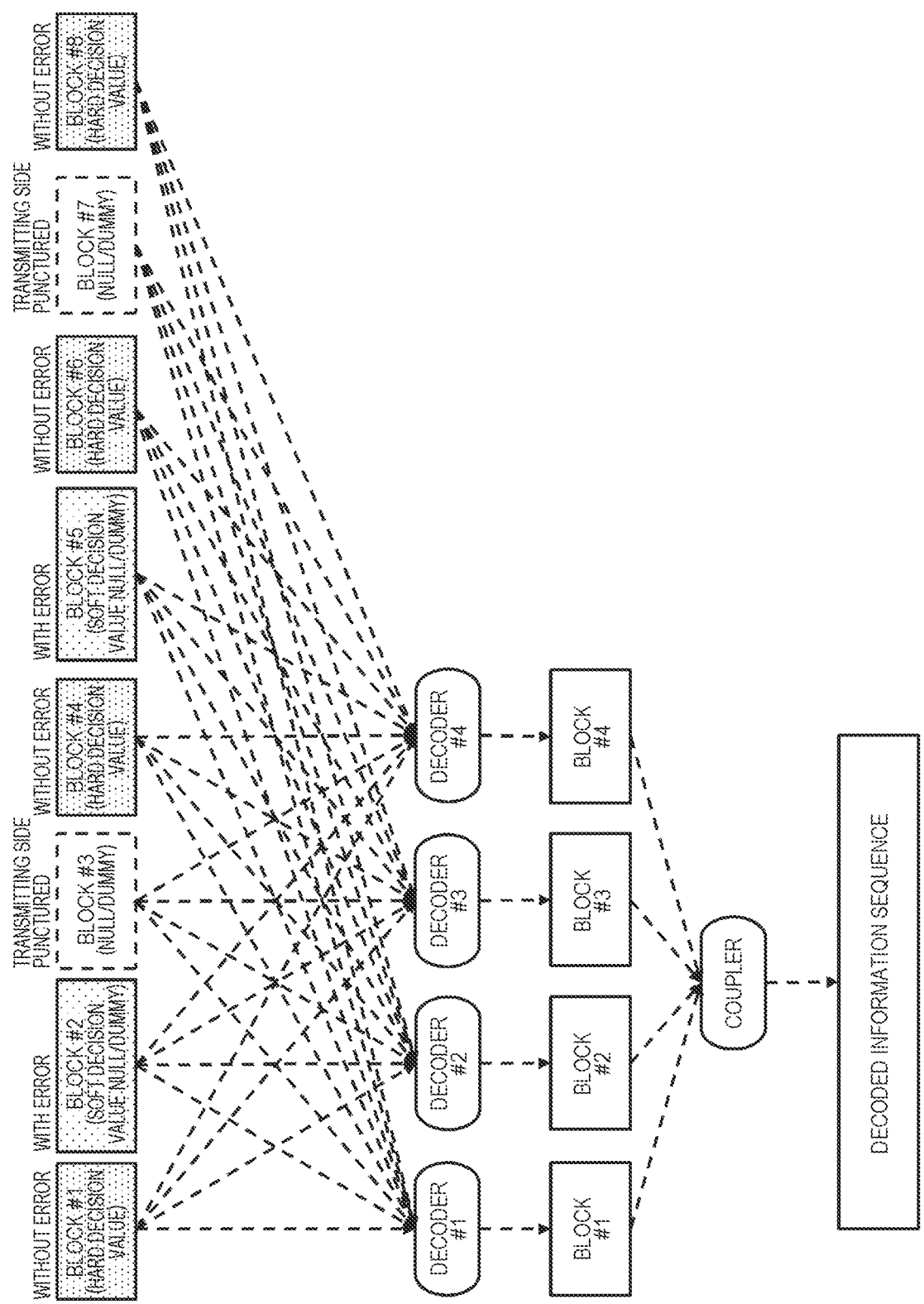
FIG. 15 is a diagram showing an example of depuncturing with a block as a unit.

The receiving side communication device implements depuncturing of each block on a block obtained after the second FEC decoding (step S1309), and synthesizes the blocks (step S1310). The processes of steps S1309 and S1310 are implemented by the second reception processing unit 303. Examples of a method of synthesizing blocks include chase combining or incremental redundancy. FIG. 14 illustrates the flow of processing leading to division of the likelihood information of the coded information sequence, rate de-matching, the second FEC decoding, and depuncturing. Furthermore, FIG. 15 shows an example (case of L=4 and N=8) of depuncturing with a block as a unit. The receiving side communication device has a function of performing HARQ synthesis, and synthesizes a block obtained by dividing the received information sequence received this time and a block obtained by dividing the received information sequence received last time. Furthermore, in the process of the second FEC decoding in retransmission, the second FEC decoding is implemented only for a block in which an error has occurred in the second FEC decoding last time as can be seen from FIG. 15. In the depuncturing according to the present embodiment, block replacement or the like is implemented before input to the first FEC decoding in the subsequent stage. Specifically, the following replacements (a) to (c) are implemented according to the state of the block.

(a) For a block that has no error as a result of the second FEC decoding, a sequence of the hard decision value (0 or 1, −1 or 1, etc.) of the block is used. Here, a block having no error as a result of second FEC decoding includes a block, decoding of which has succeeded before the last time transmission/reception, in addition to the decoding result at that time. The hard decision value of a block, transmission/reception of which has succeeded before the last time, may be recorded as a result in a memory or the like and then read therefrom.

(b) In a case where an error occurs as a result of the second FEC decoding, a sequence of a soft decision value (likelihood information) of the result of the second FEC decoding shall be replaced with either a null sequence or a dummy sequence. Here, it is desirable that a dummy sequence is any one of a sequence in which all the blocks are zero, all blocks are +1, or all blocks are −1, −1 and +1 random numbers, 0 and 1 random numbers, or predetermined −1 and +1, or a sequence in which all blocks are predetermined 0 and +1.

(c) A block that is punctured on the transmitting side is replaced with either a null block or a dummy block.

The reception processing procedure will be described continuously with reference to FIG. 13 again. After implementing depuncturing, the receiving side communication device inputs each block to the decoder of the first FEC decoding to obtain a decoded block (step S1311). Accordingly, the first FEC decoding is implemented after depuncturing is performed for a sequence obtained after the second FEC decoding. The first FEC decoding processing is implemented by the first FEC decoding unit 304. In the first FEC decoding, the first FEC decoding processing is implemented using a block in which no error has occurred in the second decoding last time, in addition to the block obtained after the second FEC decoding. Then, the receiving side communication device detects whether there is an error in the result of first FEC decoding or not by using the CRC bit sequence added on the transmitting side (step S1312). The process of step S1312 is implemented by the third reception processing unit 305.

In a case where no error is detected in the result of the first FEC decoding (No in step S1313), the receiving side communication device passes the decoded information sequence to the upper layer even if an error is detected in the second FEC decoding (step S1316), returns ACK to the transmitting side communication device (step S1317), and terminates this processing. Accordingly, it can be said that reliability enhancement can be realized by introducing a plurality of FEC codes into a communication system. Furthermore, by introducing a plurality of FEC codes, latency lowering and reliability enhancement are realized while substantially preventing increase in the amount of data to be transmitted/received in the physical layer or reducing the amount of data to be transmitted/received in the physical layer even in a status where an error occurs in single FEC.

On the other hand, in a case where an error is detected in the result of the first FEC decoding (Yes in step S1313), the receiving side communication device generates information regarding a block to be retransmitted from the record of the error for each block (step S1314), returns NACK to the transmitting side communication device (step S1315), and terminates this processing. Here, the contents of NACK shall include, for example, at least one of the fact that the target information sequence is incorrect, the block number (index) before the first FEC coding in which an error has occurred, or the block number (index) after the first FEC coding in which an error has occurred, in other words, information for specifying which of blocks obtained after second FEC decoding includes the error.

Figure 16:
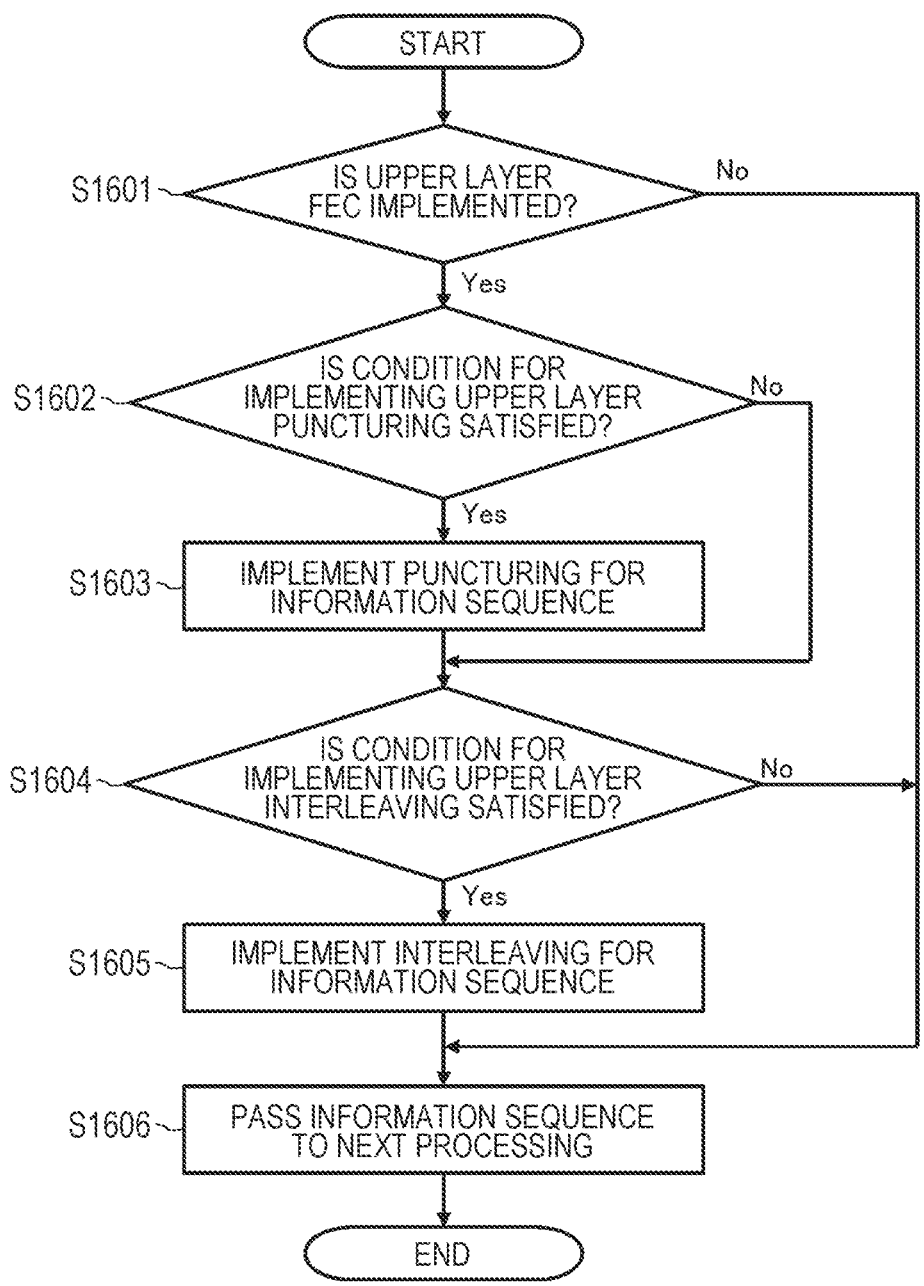
FIG. 16 is a flowchart showing a processing procedure for determining whether to implement puncturing and interleaving in an upper layer on the transmitting side or not.

FIG. 16 shows a processing procedure for determining whether to implement puncturing and interleaving in the upper layer on the transmitting side or not in the form of a flowchart.

First, whether the upper layer FEC is implemented or not is checked (step S1601). In a case where the upper layer FEC is not implemented (No in step S1601), the information sequence is passed to the next process (step S1606) without implementing either upper layer depuncturing or interleaving, and this processing is terminated.

On the other hand, in a case where upper layer FEC is implemented (Yes in step S1601), whether the condition for implementing upper layer puncturing is satisfied or not is then checked (step S1602). Then, in a case where the condition for implementing the upper layer puncturing is satisfied (Yes in step S1602), puncturing is implemented for the information sequence in the transmitting side upper layer (step S1603).

Then, whether the condition for implementing upper layer interleaving is satisfied or not is checked (step S1604). Then, in a case where the condition for implementing the upper layer interleaving is satisfied (Yes in step S1604), interleaving is implemented for the information sequence in the transmitting side upper layer (step S1605).

Then, the information sequence (obtained after the upper layer depuncturing is implemented) is passed to the next processing (step S1606), and this processing is terminated.

Puncturing and interleaving of the upper layer is based on implementation of the first FEC coding. This is because decoding cannot be performed on the receiving side when puncturing is performed without the first FEC coding. Furthermore, it can be said that the interleaving has no effect (or the effect is low) in a case where the first FEC coding is not implemented. In a case where the first FEC coding is implemented and the condition for puncturing is satisfied (Yes in step S1602), puncturing is implemented in the upper layer (step S1603). Furthermore, in a case where the first FEC coding is implemented and the condition for interleaving is satisfied (Yes in step S1604), interleaving is implemented in the upper layer (step S1605). In the processing procedure shown in FIG. 16, the determination of implementation of puncturing and interleaving is performed independently. Furthermore, the order of determination and implementation of puncturing and interleaving is arbitrary, and unlike FIG. 16, the determination of implementation of interleaving may be performed first, and the determination of implementation of puncturing may be performed later.

Figure 17:
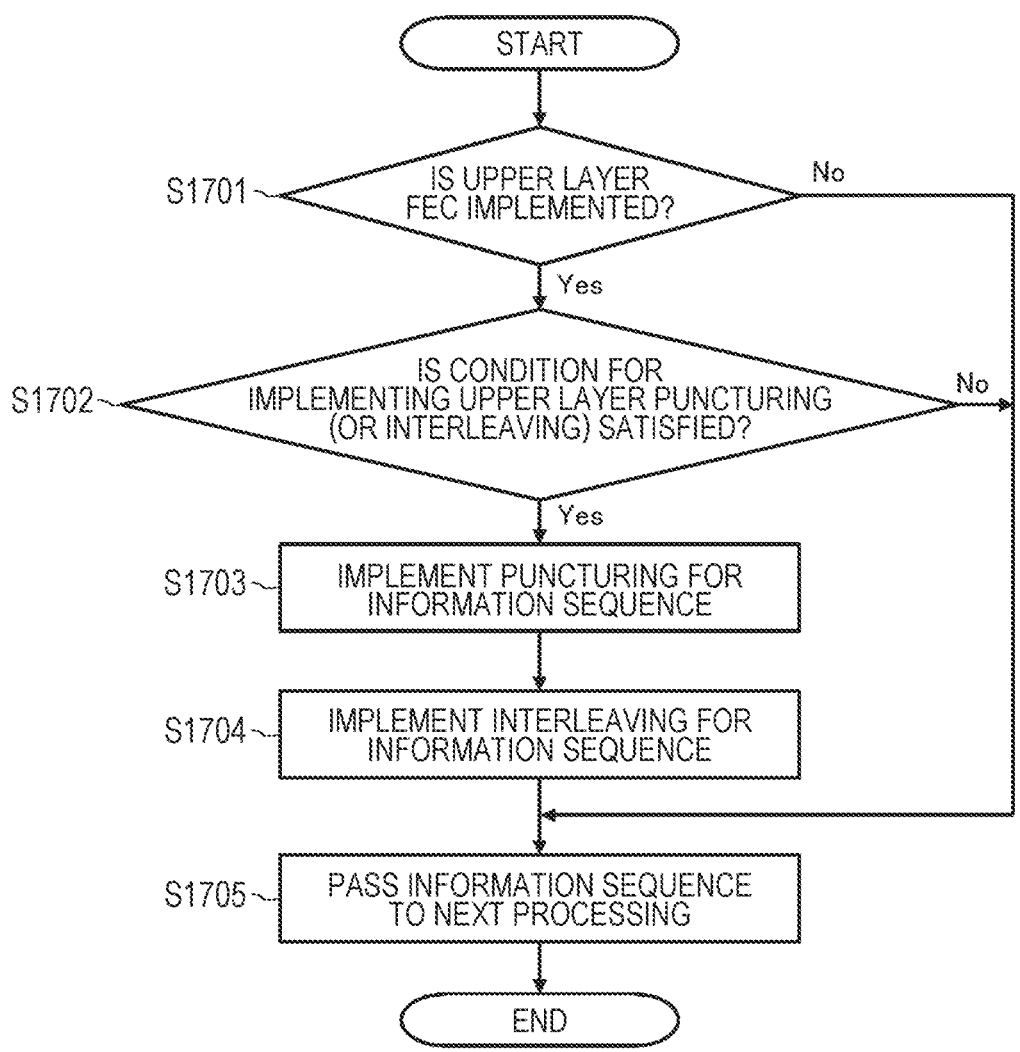
FIG. 17 is a flowchart showing another example of a processing procedure for determining whether to implement puncturing and interleaving in an upper layer on the transmitting side or not.

FIG. 17 shows another example of a processing procedure for determining whether to implement puncturing and interleaving in the upper layer on the transmitting side or not in the form of a flowchart.

First, whether the upper layer FEC is implemented or not is checked (step S1701). In a case where the upper layer FEC is not implemented (No in step S1701), the information sequence is passed to the next processing (step S1706) without implementing either upper layer depuncturing or interleaving, and this processing is terminated.

On the other hand, in a case where upper layer FEC is implemented (Yes in step S1701), whether the condition for implementing upper layer puncturing (or interleaving) is satisfied or not is checked (step S1702).

Here, in a case where the condition for implementing upper layer puncturing (or interleaving) is satisfied (Yes in step S1702), puncturing is implemented for the information sequence in the transmitting side upper layer (step S1703), and then interleaving is implemented (step S1704). Then, the information sequence (obtained after the upper layer depuncturing is implemented) is passed to the next process (step S1705), and this processing is terminated.

Furthermore, in a case where the condition for implementing upper layer puncturing (or interleaving) is not satisfied (No in step S1702), neither puncturing nor interleaving is implemented for the information sequence in the transmitting side upper layer, the information sequence (obtained after the upper layer depuncturing is implemented) is passed to the next process (step S1705), and this processing is terminated.

Although the determination of implementation of upper layer puncturing and interleaving is performed independently in the processing procedure shown in FIG. 16, the determination of implementation of both upper layer puncturing and interleaving is performed in one processing step in the processing procedure shown in FIG. 17.

Figure 18:
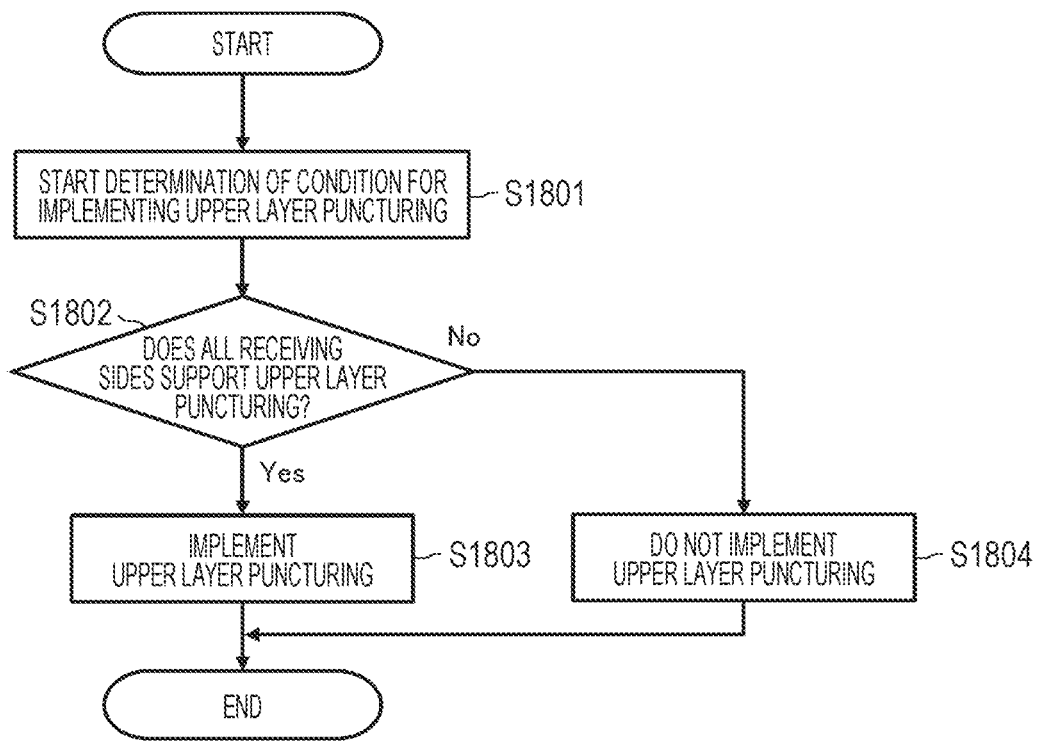
FIG. 18 is a flowchart showing a processing procedure for determining whether to implement upper layer puncturing or not.

FIG. 18 shows a processing procedure for determining whether to implement upper layer puncturing or not in the form of a flowchart.

When the transmitting side communication device starts determining the condition for implementing the upper layer puncturing (step S1801), the transmitting side communication device checks whether all the receiving side communication devices support the upper layer puncturing or not (step S1802).

In a case where all the receiving side communication devices support the upper layer puncturing (Yes in step S1802), the transmitting side communication device implements upper layer puncturing (step S1803) and terminates this processing.

On the other hand, in a case where any one of the receiving side communication devices does not support the upper layer puncturing (No in step S1802), the transmitting side communication device does not implement the upper layer puncturing (step S1804) and terminates this processing.

Similarly to the processing of determining whether to implement the first FEC coding or not (see FIGS. 8 and 9), it is possible to implement the upper layer puncturing in a case where all the receiving side communication devices support the upper layer puncturing, including the case of broadcast or multicast applications. On the other hand, upper layer puncturing should not be implemented in a case where some of the receiving side communication devices do not support upper layer puncturing.

Note that a processing procedure for determining whether to implement upper layer interleaving or not can be employed by replacing "puncturing" in FIG. 18 with "interleaving".

E. Measurement of the Performance of the First FEC and the Second FEC

The receiving side communication device may implement measurement of the performance of the first FEC and the second FEC. This measurement result may be fed back to, for example, the transmitting side communication device and reflected in the setting of the first FEC and the second FEC (setting or selection of coding method, code rate, puncturing rate, etc.) in the process of implementation of the subsequent communication. The receiving side communication device may feed back the measurement result to the transmitting side communication device by using ACK or NACK.

There is already a technology for measuring and feeding back the error rate (or reception quality) obtained after FEC decoding in a communication system that employs single FEC. On the other hand, the present embodiment differs from the prior art in that measurement of the performance is implemented for a plurality of FECs, that is, the first FEC and the second FEC. By implementing measurement of the performance of each FEC, it becomes possible to make setting of the FEC in more detail. Table 8 below summarizes the measurement items and units of measurement related to the performance of the first FEC and the second FEC.

TABLE 8

| Measurement item | Measurement unit |
| --- | --- |
| Error rate after FEC decoding | Measurement at each of point after first FEC decoding and point after second FEC decoding. |
| MCS or CQI that can satisfy predetermined reception quality | Measurement at each of point after first FEC decoding and point after second FEC decoding. Value of predetermined reception quality may be different between first FEC and second FEC. |
| Throughput | Common measurement regardless of FEC (e.g., measurement at point after first FEC decoding) |
| Delay | Common measurement regardless of FEC (e.g., measurement at point after first FEC decoding) |

Examples of the measurement item can include the error rate obtained after the first FEC decoding (e.g., the error rate with a coded block as a unit) and the error rate obtained after the second FEC decoding (e.g., the error rate with a transport block as a unit). These items are measured at a stage after the first FEC decoding and after the second FEC decoding, respectively, in the signal processing on the receiving side shown in FIG. 3. CRC is added to each coded block and each transport block. Accordingly, it is possible to measure the error rate by implementing error detection using CRC.

Instead of a method of directly measuring the error rate after the first FEC decoding or after the second FEC decoding, the MCS or channel quality indicator (CQI) that satisfies the reception quality required by each FEC may be measured (or estimated). Examples of the reception quality mentioned here include, for example, the error rate of the coded block, the error rate of the transport block, the bit error rate (BER), the block error rate (BLER), the signal-to-noise power rate (SNR), the signal-to-interference noise power rate (SINR), the received signal strength indicator (RSSI), the reference signal received power (RSRP), and the reference signal received quality (RSRQ). For example, in the receiving side communication device, the MCS or CQI capable of achieving BLER=$10^{-1}$ is estimated, so that the value is fed back to the transmitting side communication device.

In addition to the error rate, the receiving side communication device may measure the throughput value or the delay value and feed the same back to the transmitting side communication device. For example, the receiving side communication device may measure the throughput or delay at a stage after the first FEC decoding.

F. Combination of Support of First FEC in Communication Device

Table 9 below summarizes the status where the communication device supports first FEC and puncturing.

TABLE 9

| Category supporting first FEC | Category display field value | Support of first FEC | Support of puncturing | Note |
| --- | --- | --- | --- | --- |
| Communication device category A | 000 | No | No | Corresponding to legacy communication device |
| Communication device category B | 111 | Yes | Yes | Ideal communication device category |
| Communication device category C | 100 | Yes | No | Present embodiment |
| Communication device category D | 110 | Yes | Yes | Present embodiment |
| Communication device category E | 101 | Yes | No | Present embodiment |
| Communication device category F | 011 | No | Yes | Category that cannot exist (Exceptional processing or processing as category) |
| Communication device category G | 010 | No | Yes | Category that cannot exist (Exceptional processing or processing as category) |
| Communication device category H | 001 | No | No | Category that cannot exist (Exceptional processing or processing as category) |

It can be said ideal that the communication device supports both FEC and puncturing. On the other hand, there may be variations in whether puncturing is supported or not. For example, there may be a communication device category that does not support bitwise puncturing and division block-unit puncturing, or supports only one thereof.

Note that it can be said that a communication category that does not support the first FEC and supports puncturing is a category that should not exist (or has no meaning in existence).

Here, it is desirable that the meaning of "to support first FEC" means to support both coding (transmitting side) and decoding (receiving side). Furthermore, it is also desirable that the meaning of "to support puncturing" means to support both puncturing (transmitting side) and depuncturing (receiving side).

It is desirable that the information regarding the supporting status of the first FEC is shared between the transmitting side communication device and the receiving side communication device. In particular, sharing with the transmitting side communication device whether the receiving side communication device supports it or not is related to determining whether to apply the technology according to the present embodiment or not. Information regarding the supporting status is shared at the time of, for example, the connection establishment stage (Initial access) before shifting to execution of actual data communication, RRC Connection, handover (hand-off), or hand-shake.

Example 2

Here, an additional example will be described in view of the configuration of a communication system in which the technology proposed herein is adopted.

G. Case where there is a Distinction Between Roles of the Transmitting Device and the Receiving Device A communication system may be a system in which the roles of the transmitting side communication device and the receiving side communication device are substantially equal, and a system in which the roles are different. Examples of the former system in which the roles of the transmission and reception are substantially equal include, for example, the wireless LAN and Wi-Fi (registered trademark). Furthermore, examples of the latter system in which the roles of the transmission and reception are different include, for example, a cellular system, 4G, long term evolution (LTE), 5G, new radio (NR), wireless LAN after IEEE802.11ac, and Wi-Fi (registered trademark). Example of the relationship between transmission and reception with different roles include a base station device (base station (BS), eNB, gNB) and a terminal device (user equipment (UE), mobile terminal (MT), etc.), an access point device (access point (AP)) and a station device (Station (STA)), and the like. In this section, an example of a system in which the roles of transmission and reception are different will be described by unifying the examples of the base station device and the terminal device for convenience.

Figure 19:
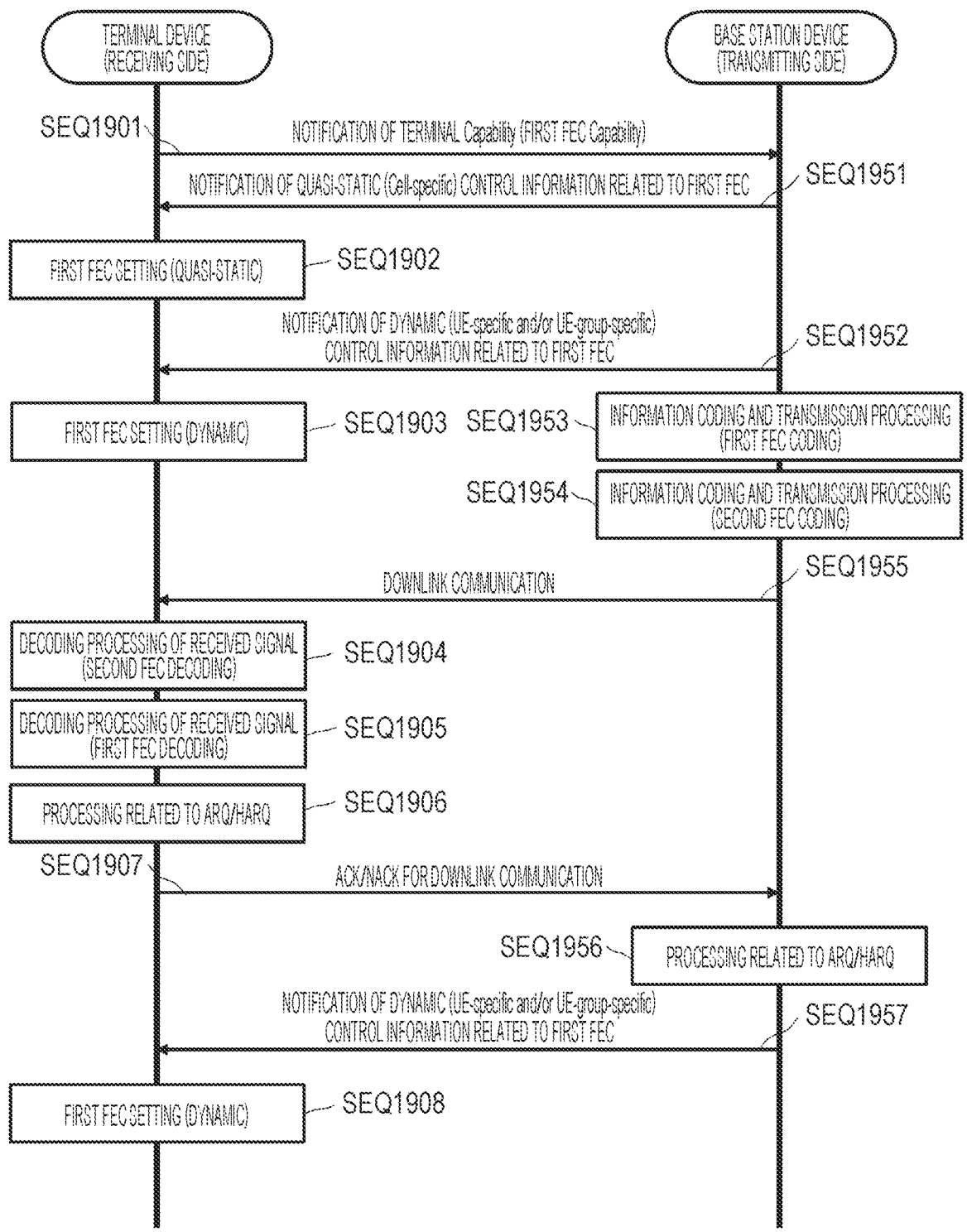
FIG. 19 is a diagram showing an example of a procedure for setting first FEC in a downlink.

FIG. 19 shows an example of a procedure for setting the first FEC in the downlink. In the downlink, the base station device functions as the transmitting side, and the terminal device connected to the cell of the base station device functions as the receiving side as shown in the figure. In this case, it is desirable that notification of application of the first FEC and specific configuration parameters is given from the base station device on the transmitting device to the terminal device on the receiving side, so that the first FEC is implemented.

First, the terminal device notifies the base station device of the cell connected with the terminal device itself of information regarding the terminal capability of the terminal device itself (SEQ1901). This capability information also includes information regarding the capability of the first FEC. The notification of information regarding the terminal capability is given during the initial access procedure or after the initial access procedure. At least any one of a random access channel (PRACH), an uplink control channel (PUCCH), or an uplink shared channel (PUSCH) is used as a physical channel for notification.

The base station device notifies the terminal device connected with a cell managed by the base station device itself of quasi-static control information including information regarding the first FEC (SEQ1951). This quasi-static control information may be cell-specific control information. The notification of this control information is given during the initial access procedure or after the initial access procedure. Furthermore, notification of this control information may be given as a part of the RRC procedure such as RRC signaling or RRC configuration. Furthermore, notification of this control information may be periodically given from the base station device to the terminal device. At least any one of a broadcast channel (PBCH), a downlink control channel (PDCCH, EPDCCH), or a downlink shared channel (PDSCH) is used as a physical channel for notification of this control information.

The terminal device implements quasi-static setting of the FEC of the terminal device itself on the basis of the quasi-static control information regarding the first FEC, notification of which has been given from the base station device (SEQ1902).

Thereafter, in a case where downlink communication occurs specifically from the base station device to the terminal device (for example, a case where the terminal device requests data download (pull) or a case where push data to the terminal device occurs, etc.), notification of control information (dynamic control information) such as a radio resource used for downlink communication is given from the base station device to the terminal device (SEQ1952). This dynamic control information may be terminal-specific (UE-specific) or terminal group-specific (UE-group-specific) control information. The terminal group mentioned here corresponds to, for example, a group of one or more terminal devices to be transmitted in a case where downlink communication is multicast or broadcast. Furthermore, the dynamic control information mentioned here includes a frequency resource (e.g., a resource block, a subcarrier, a subcarrier group, etc.) that allocates downlink communication to the target terminal device (or terminal group), a time resource (e.g., a subframe, a slot, a mini-slot, a symbol, etc.), a spatial resource (e.g., an antenna, an antenna port, a spatial layer, a spatial stream, etc.), a non-orthogonal resource (a power resource, an interleave pattern) of NOMA, MUST, IDMA, CDMA), a modulation order of a lower layer (physical layer), information regarding the FEC code rate (MCS), information regarding the coding method and the code rate of the first FEC (including upper layer puncturing, etc.), setting (NDI, RV, etc.) regarding ARQ/HARQ, and the like.

The terminal device makes setting to prepare for appropriate reception of downlink communication according to the dynamic control information received from the base station device (SEQ1903).

Thereafter, the base station device implements coding and modulation processing of the data of downlink communication to the terminal device in each of the upper layer and the lower layer so as to match the control information, notification of which has been given to the terminal device (SEQ1953, SEQ1954). Then, the base station device transmits the coded and modulated data as a radio signal to the terminal device (SEQ1955).

The terminal device implements demodulation and decoding processing of a radio signal from the base station device in each of the lower layer and the upper layer according to the above-described setting specified in the control information from the base station device (SEQ1904, SEQ1905). Then, the terminal device implements processing related to ARQ/HARQ (SEQ1906) according to whether data decoding up to first FEC has succeeded or failed, and returns ACK or NACK for downlink communication to the base station device (SEQ1907).

Here, it is desirable that the terminal device changes the setting of ARQ/HARQ processing according to whether data decoding up to first FEC has succeeded or failed. For example, in a case where decoding fails on the receiving side, it is desirable that the decoding result or data in the process of decoding on the receiving side (soft decision value, log likelihood ratio (LLR), etc.) is stored in a memory in order to implement retransmission and synthesis of the next HARQ on the transmitting side.

The base station device executes the processing to be implemented next, according to ACK/NACK received from the terminal device (SEQ1956). For example, in a case where the base station device receives the NACK notification from the terminal device, the base station device implements preparation for retransmission of ARQ/HARQ. Examples of this preparation for retransmission include RV selection, MCS selection, radio resource selection, and the like. Furthermore, in a case where the base station device receives ACK notification from the terminal device, it means that the target data has been transmitted/received without any problem, and therefore the processing shifts to communication of the next new data without performing the preparation for retransmission described above.

The base station device shifts to retransmission or implementation of downlink communication of new data according to the processing of ARQ/HARQ corresponding to ACK or NACK received from the terminal device. Therefore, the base station device notifies the terminal device of control information (dynamic control information) such as a radio resource used for downlink communication again (SEQ1957). Then, the terminal device makes setting to prepare for appropriate reception of downlink communication according to the dynamic control information received from the base station device (SEQ1908), and executes downlink communication according to the setting.

Figure 20:
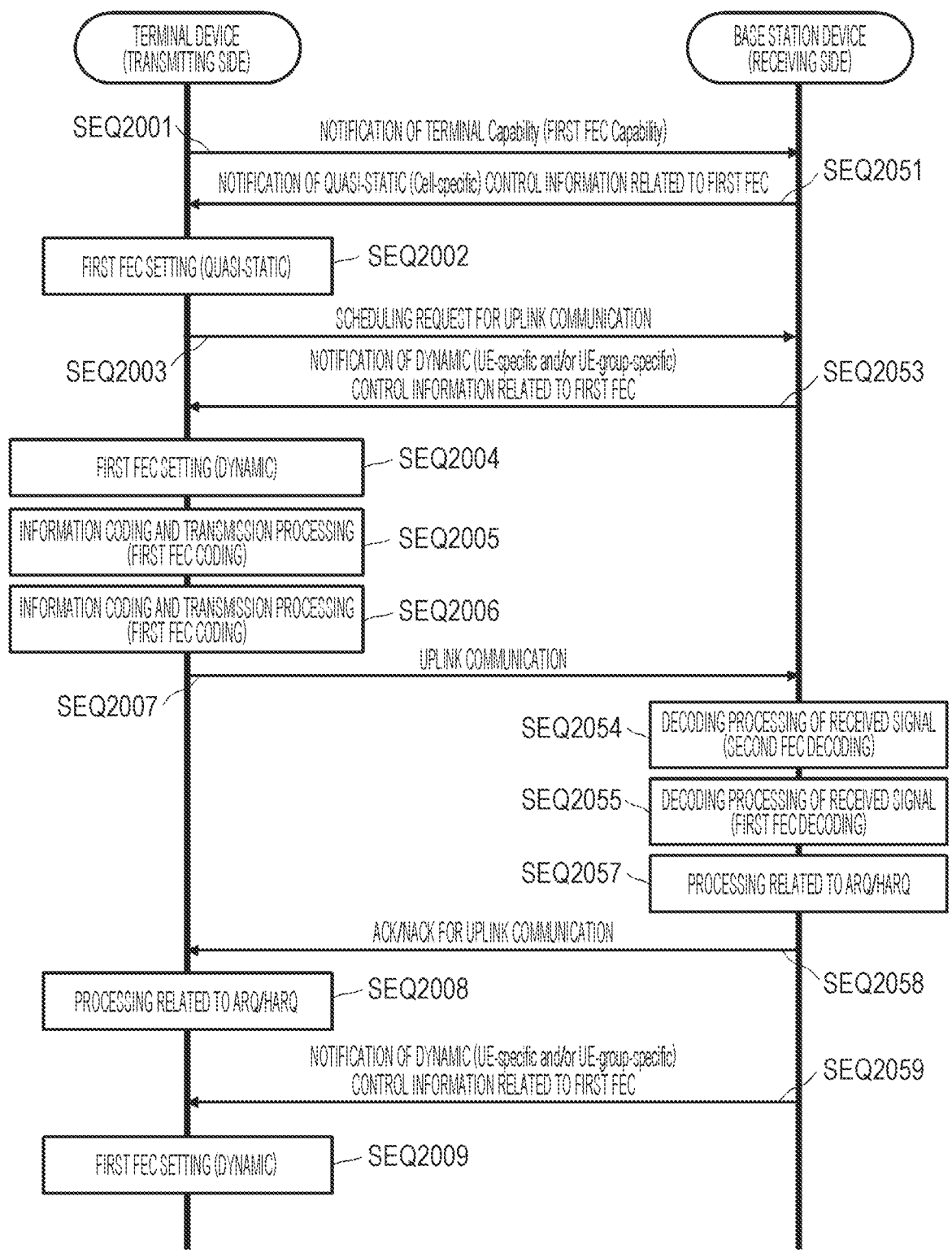
FIG. 20 is a diagram showing an example of a procedure for setting first FEC in an uplink.

FIG. 20 shows an example of a procedure for setting the first FEC in the uplink. In the uplink, the terminal device functions as the transmitting side, and the base station device of the cell connected with the terminal device functions as the receiving side as shown in the figure. In this case, it is desirable that notification of application of the first FEC and specific configuration parameters is given from the base station device on the receiving side to the terminal device on the transmitting side, so that the first FEC is implemented.

First, the terminal device notifies the base station device of the cell connected with the terminal device itself of information regarding the terminal capability of the terminal device itself (SEQ2001). This capability information also includes information regarding the capability of the first FEC. The notification of information regarding the terminal capability is given during the initial access procedure or after the initial access procedure. At least any one of a random access channel (PRACH), an uplink control channel (PUCCH), or an uplink shared channel (PUSCH) is used as a physical channel for notification.

The base station device notifies the terminal device connected with a cell managed by the base station device itself of quasi-static control information including information regarding the first FEC (SEQ2051). This quasi-static control information may be cell-specific control information. The notification of this control information is given during the initial access procedure or after the initial access procedure. Furthermore, notification of this control information may be given as a part of the RRC procedure such as RRC signaling or RRC configuration. Furthermore, notification of this control information may be periodically given from the base station device to the terminal device. At least any one of a broadcast channel (PBCH), a downlink control channel (PDCCH, EPDCCH), or a downlink shared channel (PDSCH) is used as a physical channel for notification of this control information.

The terminal device implements quasi-static setting of the FEC of the terminal device itself on the basis of the quasi-static control information regarding the first FEC, notification of which has been given from the base station device (SEQ2002).

Thereafter, in a case where uplink communication occurs specifically from the base station device to the terminal device (for example, a case where the terminal device requests data upload, a case where a data request is received from another communication device, a case where notification of periodic status information of a terminal device is given, etc.), notification of a scheduling request for uplink communication is given to the base station device (SEQ2003). As a result, the terminal device requests the base station device to allocate a radio resource and the like used for uplink communication.

When the base station device receives a scheduling request from the terminal device, the base station device notifies the terminal device of control information (dynamic control information) such as a radio resource used for uplink communication (SEQ2053). This dynamic control information may be terminal-specific (UE-specific) or terminal group-specific (UE-group-specific) control information. The terminal group mentioned here corresponds to, for example, a group of one or more terminal devices having a common part in the control information for uplink communication. Furthermore, the dynamic control information mentioned here includes a frequency resource (e.g., a resource block, a subcarrier, a subcarrier group, etc.) that allocates uplink communication to the target terminal device (or terminal group), a time resource (e.g., a subframe, a slot, a mini-slot, a symbol, etc.), a spatial resource (e.g., an antenna, an antenna port, a spatial layer, a spatial stream, etc.), a non-orthogonal resource (a power resource, an interleave pattern) of NOMA, MUST, IDMA, CDMA), a modulation order of a lower layer (physical layer), information regarding the FEC code rate (MCS), information regarding the coding method and the code rate of first FEC (including upper layer puncturing, etc.), setting regarding ARQ/HARQ (NDI, RV, etc.), and the like.

The terminal device makes setting to prepare for appropriate reception of uplink communication according to the dynamic control information received from the base station device (SEQ2004).

Thereafter, the terminal device implements coding and modulation processing of the data of uplink communication to the terminal device in each of the upper layer and the lower layer so as to match the control information, notification of which has been given from the base station device (SEQ2005, SEQ2006). Then, the terminal device transmits the coded and modulated data as a radio signal to the base station device (SEQ2007).

The base station device implements demodulation and decoding processing of a radio signal from the terminal device in each of the lower layer and the upper layer according to the above-described setting specified for the terminal device in the control information (SEQ2054, SEQ2055). Then, the base station device implements processing related to ARQ/HARQ (SEQ2057) according to whether data decoding up to first FEC has succeeded or failed, and returns ACK or NACK for uplink communication to the terminal device (SEQ2058).

Here, it is desirable that the base station device changes the setting of ARQ/HARQ processing according to whether data decoding up to first FEC has succeeded or failed. For example, in a case where decoding fails on the receiving side, it is desirable that the decoding result or data in the process of decoding on the receiving side (soft decision value, log likelihood ratio (LLR), etc.) is stored in a memory in order to implement retransmission and synthesis of the next HARQ on the transmitting side.

The terminal device executes the processing to be implemented next, according to ACK/NACK received from the base station device (SEQ2008). For example, in a case where the terminal device receives NACK notification from the base station device, the terminal device implements preparation for retransmission of ARQ/HARQ. Examples of this preparation for retransmission include waiting for the next dynamic control information from the base station device. Furthermore, in a case where the terminal device receives ACK notification from the base station device, it means that the target data has been transmitted and received without any problem, and therefore the terminal device shifts to communication of the next new data without performing the preparation for retransmission described above.

The terminal device shifts to retransmission or implementation of uplink communication of new data according to ARQ/HARQ processing corresponding to ACK or NACK received from the base station device. Therefore, the base station device notifies the terminal device of control information (dynamic control information) such as a radio resource used for uplink communication again (SEQ 2059). Then, the terminal device makes setting to prepare for appropriate reception of uplink communication according to the dynamic control information received from the base station device (SEQ2009), and executes the uplink communication according to the setting.

Figure 21:
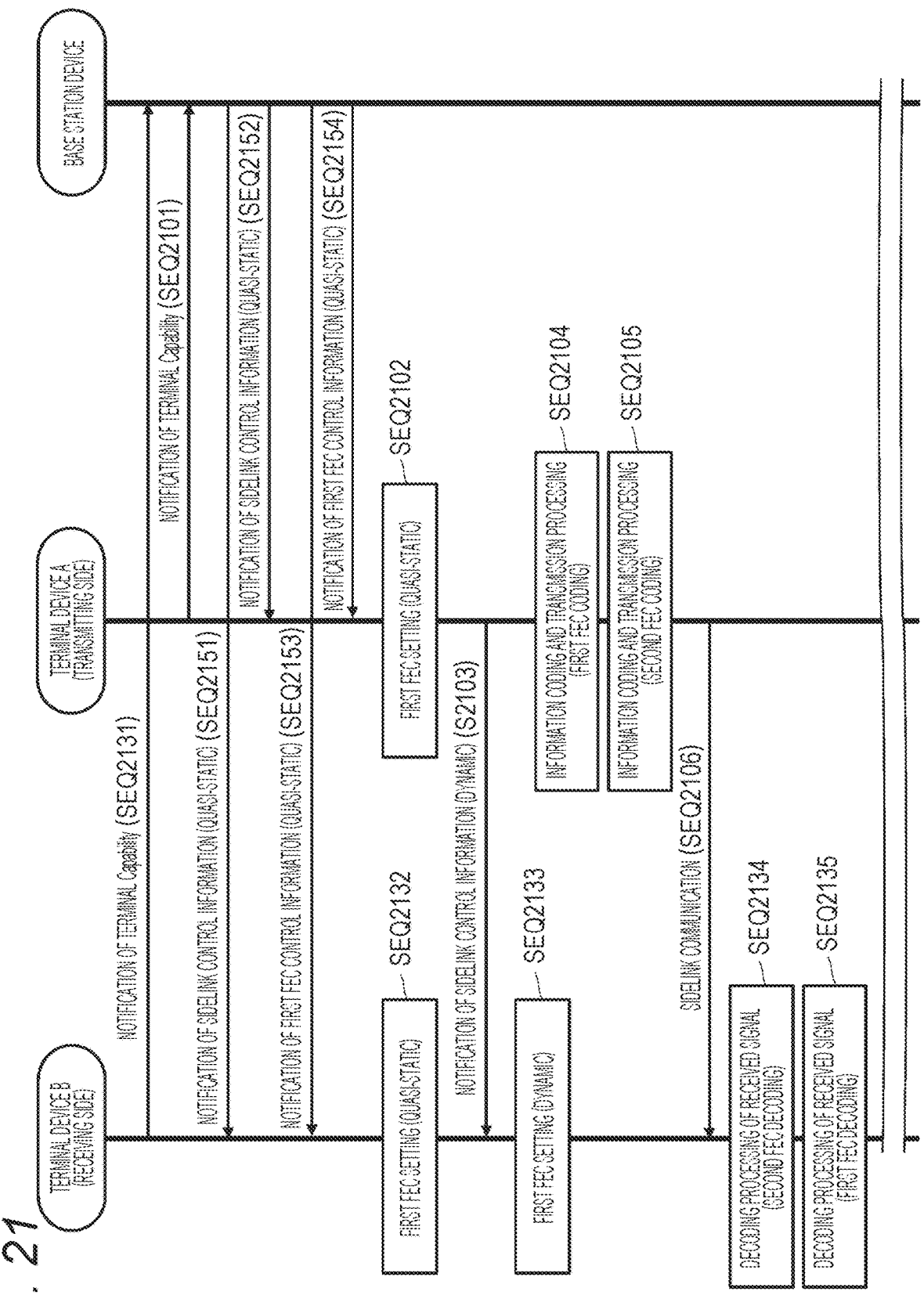
FIG. 21 is a diagram showing an example (first half) of a procedure for setting first FEC in a sidelink.
Figure 22:
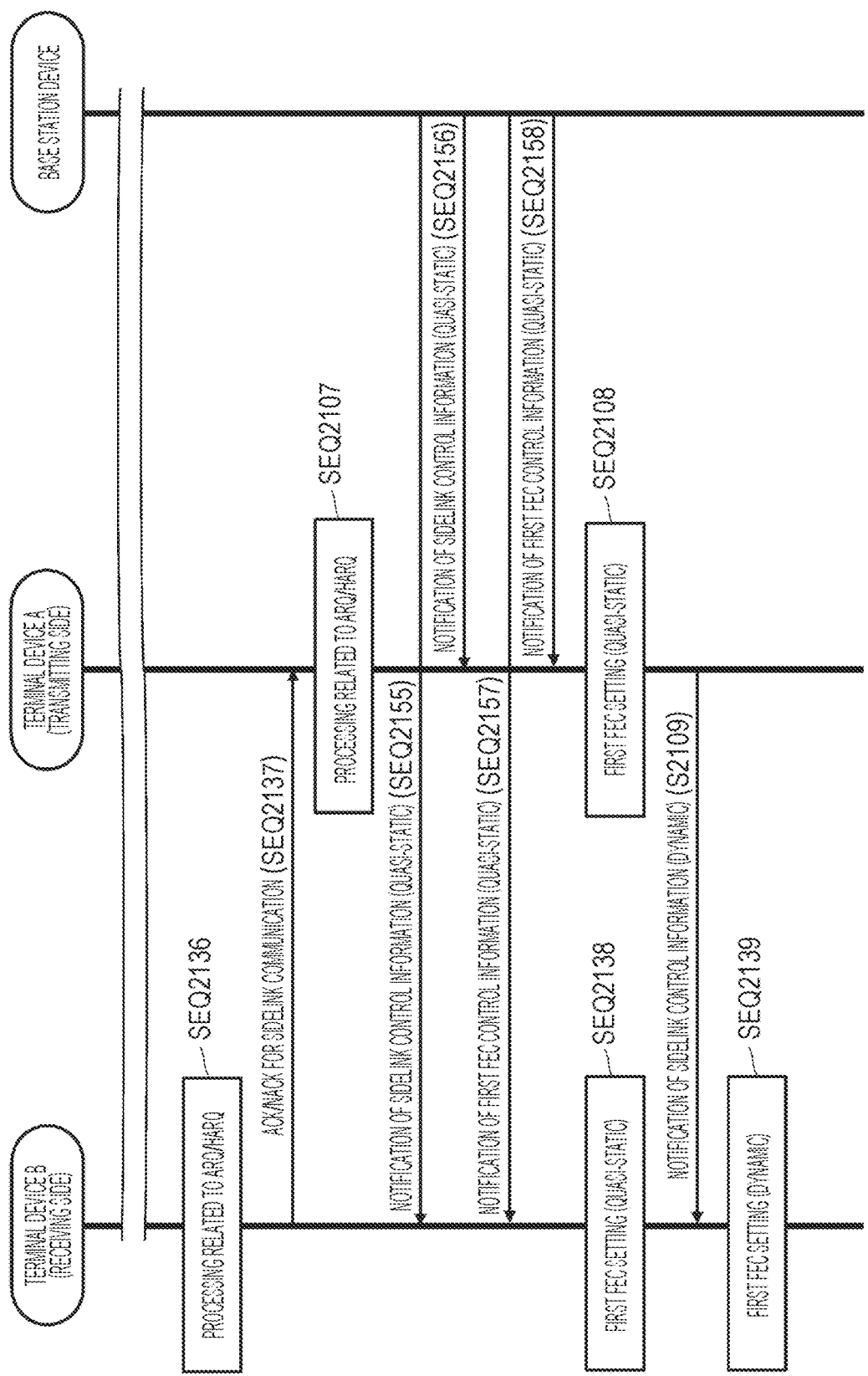
FIG. 22 is a diagram showing an example (second half) of a procedure for setting first FEC in a sidelink.

FIGS. 21 and 22 show an example of a procedure for setting the first FEC in the sidelink between the terminal devices. In the sidelink, one terminal device A connected with the cell of the base station device functions as the transmitting side, and the other terminal device B connected with the cell of the same base station device functions as the receiving side as shown in the figure. In this case, it is desirable that notification of application of the first FEC and specific configuration parameters is given from the base station device to the terminal devices A and B, so that the first FEC is implemented.

First, the terminal device B notifies the base station device of the cell connected with the terminal device B itself of information regarding the terminal capability of the terminal device B itself (SEQ2131). Similarly, the terminal device A notifies the base station device of the cell connected with the terminal device A itself of information regarding the terminal capability of the terminal device A itself (SEQ2101). The notification of information regarding the terminal capability is given during the initial access procedure or after the initial access procedure. At least any one of a random access channel (PRACH), an uplink control channel (PUCCH), or an uplink shared channel (PUSCH) is used as a physical channel for notification.

The base station device notifies the terminal devices A and B connected with a cell managed by the base station device itself of quasi-static control information including information regarding a sidelink radio resource (SEQ2151, SEQ2152). Examples of quasi-static control information regarding a radio resource of the sidelink include specification of a frequency resource (e.g., a resource block, a subcarrier group, a subcarrier, etc.) and a time resource (a radio frame, a subframe, a slot, a mini-slot, a symbol, etc.) of a radio resource pool for the sidelink. A subordinate terminal device may implement sidelink communication by using a radio resource within the range of this radio resource pool. As for the radio resource pool, it is desirable to divert a part of the uplink resource of the target cell to the radio resource pool for the sidelink. Alternatively, a part of the downlink resource of the target cell may be diverted to the radio resource pool for the sidelink. Furthermore, the base station device notifies the terminal devices A and B of quasi-static control information including information regarding the first FEC (SEQ2153, SEQ2154). Notification of the quasi-static control information regarding the radio resource of the sidelink and the quasi-static control information regarding the first FEC may be given to the individual terminal devices A and B as shown in the figure, or may be given to the terminal devices A and B simultaneously.

Such quasi-static control information may be cell-specific control information. Notification of the quasi-static control information is given during the initial access procedure or after the initial access procedure. Furthermore, notification of this control information may be given as a part of the RRC procedure such as RRC signaling or RRC configuration. Furthermore, notification of this control information may be periodically given from the base station device to the terminal devices A and B. At least any one of a broadcast channel (PBCH), a downlink control channel (PDCCH, EPDCCH), or a downlink shared channel (PDSCH) is used as a physical channel for giving notification of the control information.

The terminal devices A and B respectively implement quasi-static setting of FEC of the terminal devices A and B themselves on the basis of the quasi-static control information regarding the first FEC, notification of which has been given from the base station device (SEQ2102, SEQ2132).

Thereafter, in a case where sidelink communication occurs from the terminal device A to the terminal device B specifically (for example, a case where direct communication between terminal devices occurs, a case where the terminal device A receives a request for direct communication from the terminal device B, etc.), the terminal device A on the transmitting side notifies the terminal device B on the receiving side of control information (dynamic control information) such as a radio resource used for sidelink communication (SEQ2103). This dynamic control information may be terminal-specific (UE-specific) or terminal group-specific (UE-group-specific) control information. The terminal group mentioned here corresponds to, for example, a group of one or more terminal devices to be transmission destination of a case where sidelink communication is multicast or broadcast. Furthermore, the dynamic control information mentioned here includes a frequency resource (e.g., a resource block, a subcarrier, a subcarrier group, etc.) that allocates sidelink communication to the target terminal device (or terminal group), a time resource (e.g., a subframe, a slot, a mini-slot, a symbol, etc.), a spatial resource (e.g., an antenna, an antenna port, a spatial layer, a spatial stream, etc.), a non-orthogonal resource (a power resource, an interleave pattern) of NOMA, MUST, IDMA, CDMA), a modulation order of a lower layer (physical layer), information regarding the FEC code rate (MCS), information regarding the coding method and the code rate of the first FEC (including upper layer puncturing, etc.), setting regarding ARQ/HARQ (NDI, RV, etc.), and the like.

The receiving side terminal device B makes setting to prepare for appropriate reception of sidelink communication according to the dynamic control information received from the transmitting side terminal device A (SEQ2133).

Thereafter, the terminal device A implements coding and modulation processing of the data of sidelink communication to the terminal device B in each of the upper layer and the lower layer so as to match the control information, notification of which has been given to the terminal device B (SEQ2104, SEQ2105). Then, the terminal device A transmits the coded and modulated data as a radio signal to the terminal device B (SEQ2106).

The terminal device B implements demodulation and decoding processing of a radio signal from the terminal device A in each of the lower layer and the upper layer according to the above-described setting specified in the control information from the terminal device A (SEQ2134, SEQ2135). Then, the terminal device B implements processing related to ARQ/HARQ (SEQ2136) according to whether data decoding up to first FEC has succeeded or failed, and returns ACK or NACK for downlink communication to the terminal device A (SEQ2137).

Here, it is desirable that the terminal device B changes the setting of ARQ/HARQ processing according to whether data decoding up to first FEC has succeeded or failed. For example, in a case where decoding has failed on the receiving side, it is desirable that the decoding result or data in the process of decoding on the receiving side terminal device B (soft decision value, log likelihood ratio (LLR), etc.) is stored in a memory in order to implement retransmission and synthesis of the next HARQ on the transmitting side terminal device A.

The terminal device A executes the processing to be implemented next, according to ACK/NACK received from the terminal device B (SEQ2107). For example, in a case where the terminal device A receives NACK notification from the terminal device B, the terminal device A implements preparation for retransmission of ARQ/HARQ. Examples of this preparation for retransmission include waiting for the next dynamic control information. Furthermore, in a case where the terminal device A receives ACK notification from the terminal device B, it means that the target data has been transmitted and received without any problem, and therefore the terminal device A shifts to a scheduling request for communication of the next new data without performing the preparation for retransmission described above.

The terminal device A shifts to retransmission or implementation of sidelink communication of new data according to ARQ/HARQ processing corresponding to ACK or NACK received from the terminal device B.

The base station device notifies terminal devices A and B of quasi-static control information including information regarding a sidelink radio resource again (SEQ2155, SEQ2156), and furthermore, quasi-static control information including information regarding the first FEC again (SEQ2157, SEQ2158). Then, the terminal devices A and B respectively implement quasi-static setting of the FEC of the terminal devices A and B themselves on the basis of the quasi-static control information regarding the first FEC, notification of which has been given from the base station device (SEQ2108, SEQ2138).

Next, the terminal device A notifies the terminal device B of control information (dynamic control information) such as a radio resource used for sidelink communication again (SEQ2109). Then, the terminal device B makes setting to prepare for appropriate reception of side link communication according to the dynamic control information received from the terminal device A (SEQ2139), and executes sidelink communication according to the setting.

H. Case where the Roles of the Transmitting Device and the Receiving Device are Substantially Equal Examples of a system in which the roles of the transmission and reception are substantially equal include, for example, the wireless LAN and Wi-Fi (registered trademark) (as described above). In this section, an example of a system in which the roles of transmission and reception are substantially equal will be described.

Figure 23:
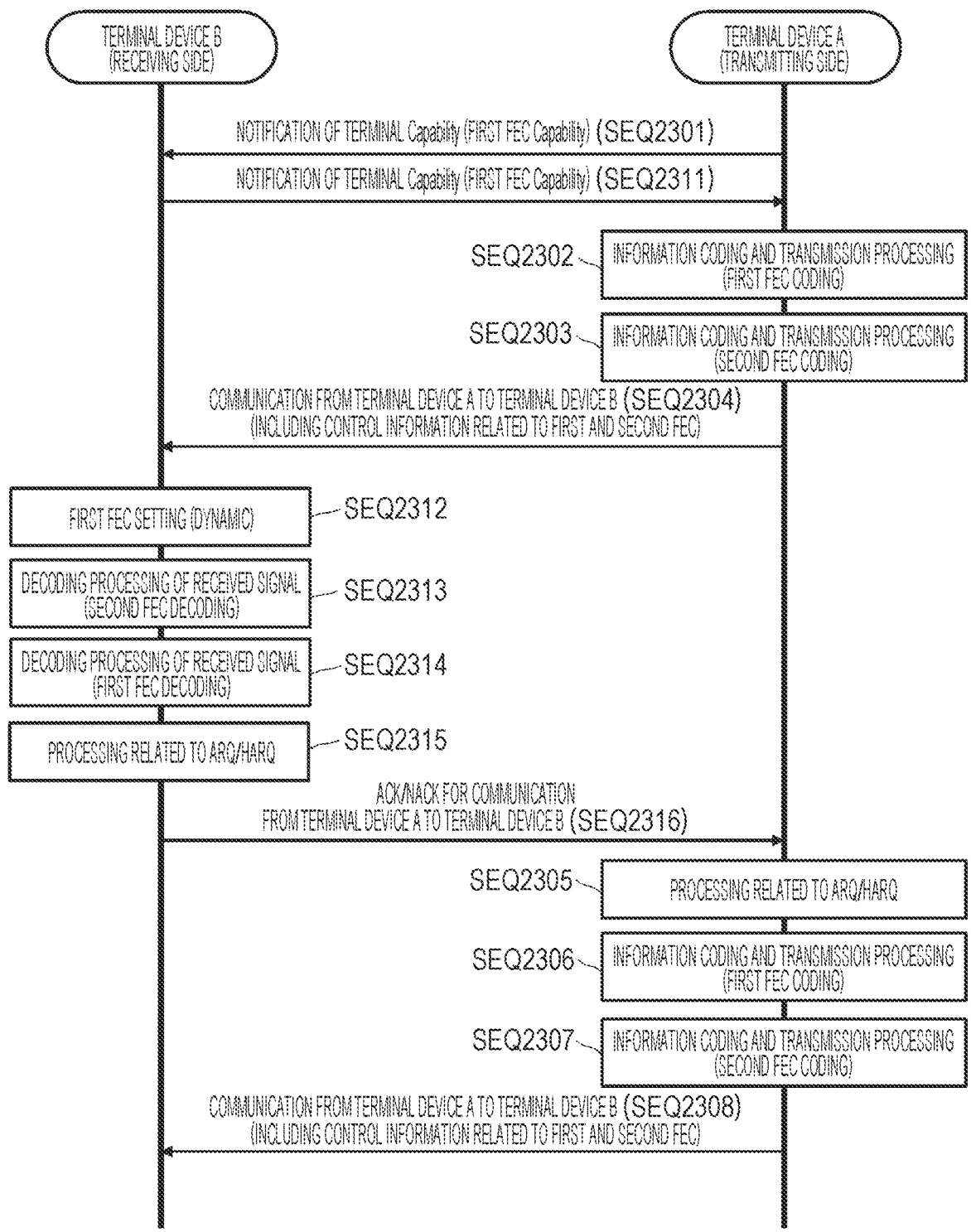
FIG. 23 is a diagram showing an example of a procedure for setting first FEC in a communication system having substantially equal roles in transmission and reception.

FIG. 23 shows an example of a procedure for setting the first FEC in a communication system in which the roles of transmission and reception are substantially equal. As shown in the figure, the terminal device A functions as the transmitting side, and the terminal device B functions as the receiving side.

The terminal device A notifies the terminal device B, which functions as a substantially equal communication partner, of information regarding the terminal capability of the terminal device A itself (SEQ2301). This capability information also includes information regarding the capability of the first FEC. Similarly, the terminal device B notifies the terminal device A of information regarding the terminal capability of the terminal device B itself (SEQ2311).

In a case where data transmission to the terminal device B occurs in the terminal device A, the terminal device A implements coding and modulation processing of the data to be transmitted in each of the upper layer and the lower layer according to the capability of the terminal device A and the terminal device B (SEQ2302, SEQ2303).

Then, the terminal device A transmits the coded and modulated data as a radio signal to the terminal device B (SEQ2304). This radio signal is configured with each part of a lower layer preamble, a lower layer header, a lower layer payload, and a lower layer CRC as a lower layer packet (or a lower layer frame).

The lower layer preamble includes dynamic control information regarding lower layers of lower layer MCS, FEC coding, a frequency resource (a resource block, a subcarrier group, a subcarrier, etc.), a time resource (the lower layer frame length (the number of symbols), etc.), or a spatial resource (an antenna, an antenna port, a spatial layer, a spatial stream, etc.). It is desirable that dynamic control information of this lower layer is valid only for this lower layer packet. The lower layer payload is further configured with one or more division blocks (corresponding to the division blocks and coded blocks described above). The division block is configured with an upper layer header (including first FEC information), an upper layer payload, and upper layer CRC.

When the terminal device B receives a radio signal (lower layer packet) from the terminal device A, the terminal device B decodes the lower layer header, acquires dynamic control information necessary for demodulating and decoding the lower layer payload, and sets the dynamic control information in the terminal device itself (SEQ2312).

The terminal device B implements demodulation and decoding processing of the lower layer payload on the basis of the dynamic control information of a lower layer (SEQ2313). Then, the terminal device B demodulates and decodes the payload of a lower layer, and then implements decoding (including first FEC decoding and interleaving/deinterleaving) of a division block in an upper layer (SEQ2314).

When decoding including first FEC is completed, the terminal device B implements processing related to ARQ/HARQ according to whether data decoding up to first FEC has succeeded or failed (SEQ2315), and implements or updates the setting related to ARQ/HARQ. Then, the terminal device B returns ACK or NACK to the terminal device A depending on whether data decoding has succeeded or failed (SEQ2316).

The terminal device A executes ARQ/HARQ processing corresponding to ACK/NACK received from the terminal device B (SEQ2305). Then, the terminal device A shifts to retransmission or transmission processing of new data according to ARQ/HARQ processing. That is, the terminal device A implements coding and modulation processing of the data to be transmitted in each of the upper layer and the lower layer (SEQ2306, SEQ2307), and transmits the coded and modulated data as a radio signal to the terminal device B (SEQ2308).

Finally, the effects of the technology proposed herein will be mentioned.

It is possible with the technology proposed herein to realize latency lowering and reliability enhancement while substantially preventing increase in the amount of data to be transmitted/received in the physical layer or reducing the amount of data to be transmitted/received in the physical layer even in a status where an error occurs in single FEC, by introducing a plurality of FEC codes into a communication system and implementing puncturing with a coded block as a unit.

INDUSTRIAL APPLICABILITY

The technology disclosed herein has been described above in detail with reference to specific embodiments. However, it is obvious that a person skilled in the art can make modifications or substitutions of the embodiments without departing from the gist of the technology disclosed herein.

The technology disclosed herein can be applied to, for example, any of a communication system in which the roles of the transmission and reception are substantially equal, such as the wireless LAN or Wi-Fi (registered trademark), and a communication system in which the roles of the transmission and reception are different, such as a cellular system, 4G, LTE, 5G, NR, wireless LAN after IEEE802.11ac, or Wi-Fi.

In short, the technology disclosed herein has been described in the form of exemplification, and the contents described herein should not be interpreted in a limited manner. To determine the gist of the technology disclosed herein, the claims should be taken into consideration.

Note that the technology disclosed herein can also have the following configurations.

(1) A communication device including:
a first CRC addition unit that adds a CRC sequence to an information sequence to be transmitted;
a division unit that divides an information sequence having a CRC sequence added thereto into a plurality of sequences;
a first FEC coding unit that implements first FEC coding by using a sequence obtained by division;
a second CRC addition unit that adds a CRC sequence to a coded sequence obtained after first FEC coding;
a second FEC coding unit that implements second FEC coding by using a coded sequence having a CRC sequence added thereto;
a coupling unit that couples coded sequences obtained after second coding;
a transmitting unit that transmits a coded information sequence obtained after coupling to another communication device; and
a retransmission control unit that controls retransmission with a coded sequence obtained after first coding as a unit.

(1-1) The communication device according to (1), further including a padding unit that adds a padding bit so that data sizes of sequences obtained by division become equal.

(1-2) The communication device according to (1), in which first FEC is any one of an erasure code, a rateless code, a Raptor code, or a Raptor Q code.

(1-3) The communication device according to (1), in which second FEC is either an LDPC code or a Polar code.

(2) The communication device according to (1), further including
a determination unit that determines whether to implement first FEC coding or not.

(3) The communication device according to (2), in which the determination unit determines whether to implement first FEC coding or not on the basis of at least one of status of a receiving side communication device, an application of a target information sequence, or status of a target information sequence.

(4) The communication device according to any one of (1) to (3),
in which the second FEC coding unit implements second FEC coding by using some of a plurality of coded sequences obtained after first FEC coding.

(4-1) The communication device according to (4), in which the second FEC coding unit changes a coded sequence to be subjected to second FEC coding according to the number of transmission times of an information sequence.

(4-2) The communication device according to (4-1), in which the second FEC coding unit selects a coded sequence, for which second FEC coding is not performed, on the basis of transmission/reception result of previous transmission.

(4-2-1) The communication device according to (4-2), in which the second FEC coding unit does not implement second FEC coding for a coded sequence, transmission/reception of which has succeeded in previous transmission.

(4-2-2) The communication device according to (4-2), in which second FEC coding is implemented for at least some of coded sequences that have not been transmitted in the last time transmission.

(5) The communication device according to any one of (1) to (3),
in which the second FEC coding unit punctures some of a plurality of coded sequences obtained after first FEC coding, and implements second FEC coding by using the other coded sequences.

(6) The communication device according to any one of (1) to (5),
in which the coupling unit couples some of a plurality of coded sequences obtained after second FEC coding.

(7) The communication device according to any one of (1) to (6),
in which the retransmission control unit retransmits at least some of coded sequences that have not been transmitted in the last time transmission.

(8) The communication device according to any one of (1) to (6),
in which the retransmission control unit implements retransmission by a combination of different coded sequences for each transmission time.

(9) The communication device according to any one of (1) to (6),
in which the retransmission control unit selects a coded sequence to be retransmitted on the basis of transmission/reception result of previous transmission.

(9-1) The communication device according to (9),
in which the retransmission control unit retransmits at least some of coded sequences, transmission/reception of which has failed in the last time transmission.

(10) A communication method including:
a first CRC addition step of adding a CRC sequence to an information sequence to be transmitted;
a division step of dividing an information sequence having a CRC sequence added thereto into a plurality of sequences;
a first FEC coding step of implementing first FEC coding by using a sequence obtained by division;
a second CRC addition step of adding a CRC sequence to a coded sequence obtained after first FEC coding;
a second FEC coding step of implementing second FEC coding by using a coded sequence having a CRC sequence added thereto;
a coupling step of coupling coded sequences obtained after second coding;
a transmission step of transmitting a coded information sequence obtained after coupling to another communication device; and
a retransmission step of controlling retransmission with a coded sequence obtained after first coding as a unit.

(11) A communication device including:
a division unit that divides a received information sequence generated from a received signal into a plurality of sequences;
a second decoding unit that implements second FEC decoding by using a sequence obtained by division;
a first determination unit that determines whether a sequence obtained after second FEC decoding includes an error or not;
a first decoding unit that implements first FEC decoding by using a sequence obtained after second FEC decoding;
a second determination unit that determines whether a sequence obtained after first decoding includes an error or not; and
a control unit that controls transmission of ACK or NACK to a communication device on a transmitting side on the basis of determination result by the second determination unit.

(11-1) The communication device according to (11),
in which first FEC is any one of an erasure code, a rateless code, a Raptor code, or a Raptor Q code.

(11-2) The communication device according to (11),
in which second FEC is either an LDPC code or a Polar code.

(12) The communication device according to (11),
in which the control unit controls transmission of NACK including information for identifying which of sequences obtained after second FEC decoding includes an error in a case where a sequence obtained after first decoding includes an error.

(12-1) The communication device according to (11) or (12),
in which the control unit controls retransmission with a coded sequence obtained after first coding as a unit.

(13) The communication device according to (11) or (11), further having a function of HARQ synthesis,
in which the second FEC decoding unit implements second FEC decoding only for a sequence in which an error has occurred in second FEC decoding last time.

(14) The communication device according to (13),
in which a sequence obtained by dividing a received information sequence received this time and a sequence obtained by dividing a received information sequence received last time are synthesized.

(15) The communication device according to (14),
in which a sequence obtained by dividing a received information sequence is synthesized by one synthesis method of chase combining or incremental redundancy.

(16) The communication device according to (14) or (15),
in which the first decoding unit implements first FEC decoding processing by using a sequence in which no error has occurred in second decoding last time in addition to a sequence obtained after second FEC decoding.

(17) The communication device according to any one of (12) to (16),
in which the first decoding unit implements first FEC decoding processing by using a dummy information sequence in addition to a sequence obtained after second FEC decoding.

(18) The communication device according to any one of (12) to (16),
in which the first decoding unit implements first FEC decoding processing after depuncturing is performed for a sequence obtained after second FEC decoding.

(19) The communication device according to (17),
in which a dummy information sequence is an information sequence configured with a predetermined value.

(20) The communication device according to any one of (11) to (19), further including
a measuring unit that measures reception quality at at least one stage after decoding by the second decoding unit or after decoding by a decoding unit by the first decoding unit.

(21) A communication method including:
a division step of dividing a received information sequence generated from a received signal into a plurality of sequences;
a second decoding step of implementing second FEC decoding by using a sequence obtained by division;
a first determination step of determining whether a sequence obtained after second FEC decoding includes an error or not;
a first decoding step of implementing first FEC decoding by using a sequence obtained after second FEC decoding;
a second determination step of determining whether a sequence obtained after first decoding includes an error or not; and
a control step of controlling transmission of ACK or NACK to a communication device on a transmitting side on the basis of determination result in the second determination step.

(22) The communication device according to any one of (1) to (9) or (11) to (20),
which operates as a terminal device connected with a cell of a base station device, and
acquires at least one of information regarding a setting of first FEC or information regarding a setting of second FEC from the base station device.

(23) The communication device according to (22),
which acquires information regarding a setting of first FEC and information regarding a setting of second FEC from the same control information.

(24) The communication device according to (22),
which acquires information regarding a setting of first FEC and information regarding a setting of second FEC from different control information.

(25) The communication device according to (22),
which acquires a part of information regarding a setting of first FEC and information regarding a setting of second FEC from quasi-static control information, and acquires another part of information regarding a setting of first FEC and information regarding a setting of second FEC from dynamic control information

(26) The communication device according to (22), which determines whether first FEC is implemented or not on the basis of information regarding a setting of first FEC.

(27) The communication device according to any one of (1) to (9) or (11) to (20),
which operates as a base station device, and
notifies a terminal device connected with a cell of the communication device itself of at least one of information regarding a setting of first FEC or information regarding a setting of second FEC.

(28) The communication device according to (27),
which notifies the terminal device of information regarding a setting of first FEC and information regarding a setting of second FEC by using the same control information.

(29) The communication device according to (27),
which notifies the terminal device of information regarding a setting of first FEC and information regarding a setting of second FEC by using different control information.

(30) The communication device according to (27),
which notifies the terminal device of a part of information regarding a setting of first FEC and information regarding a setting of second FEC by quasi-static control information, and notifies the terminal device of another part of information regarding a setting of first FEC and information regarding a setting of second FEC by dynamic control information.

(31) The communication device according to (27),
which notifies the terminal device of whether first FEC is implemented or not on the basis of information regarding a setting of first FEC.

REFERENCE SIGNS LIST

201 First transmission processing unit
202 First FEC coding unit
203 Second transmission processing unit
204 Second FEC coding unit
205 Third transmission processing unit
301 First reception processing unit
302 Second FEC decoding unit
303 Second reception processing unit
304 First FEC decoding unit
305 Third reception processing unit

The invention claimed is:
1. A communication device, comprising:
a first CRC addition unit that adds a first CRC sequence to an information sequence to be transmitted;
a division unit that divides an information sequence having the first CRC sequence added thereto into a plurality of sequences;
a first FEC coding unit that implements first FEC coding by using a sequence obtained by division;
a second CRC addition unit that adds a second CRC sequence to a coded sequence obtained after the first FEC coding;
a second FEC coding unit that implements second FEC coding by using a coded sequence having the second CRC sequence added thereto;
a coupling unit that couples coded sequences obtained after the second FEC coding;
a transmitting unit that transmits a coded information sequence obtained after coupling to another communication device; and
a retransmission control unit that controls retransmission with the coded sequence obtained after the first FEC coding as a unit.

2. The communication device according to claim 1, further comprising
a determination unit that determines whether to implement the first FEC coding or not.

3. The communication device according to claim 2,
wherein the determination unit determines whether to implement the first FEC coding or not on a basis of at least one of status of a receiving side communication device, an application of a target information sequence, or status of the target information sequence.

4. The communication device according to claim 1,
wherein the second FEC coding unit implements the second FEC coding by using some of a plurality of coded sequences obtained after the first FEC coding.

5. The communication device according to claim 1,
wherein the second FEC coding unit punctures some of a plurality of coded sequences obtained after the first FEC coding, and implements the second FEC coding by using other coded sequences.

6. The communication device according to claim 1,
wherein the coupling unit couples some of a plurality of coded sequences obtained after the second FEC coding.

7. The communication device according to claim 1,
wherein the retransmission control unit retransmits at least some of coded sequences that have not been transmitted in last time transmission.

8. The communication device according to claim 1,
wherein the retransmission control unit implements retransmission by a combination of different coded sequences for each transmission time.

9. The communication device according to claim 1,
wherein the retransmission control unit selects the coded sequence to be retransmitted on a basis of one of transmission or reception result of previous transmission.

10. A communication method, comprising:
adding a first CRC sequence to an information sequence to be transmitted;
dividing an information sequence having the first CRC sequence added thereto into a plurality of sequences;
implementing first FEC coding by using a sequence obtained by division;
adding a second CRC sequence to a coded sequence obtained after the first FEC coding;
implementing second FEC coding by using a coded sequence having the second CRC sequence added thereto;
coupling coded sequences obtained after the second FEC coding;
transmitting a coded information sequence obtained after coupling to another communication device; and a retransmission step of controlling retransmission with the coded sequence obtained after the first FEC coding as a unit.

\* \* \* \* \*